US007565491B2

(12) United States Patent
Lemen et al.

(10) Patent No.: US 7,565,491 B2
(45) Date of Patent: Jul. 21, 2009

(54) ASSOCIATIVE MATRIX METHODS, SYSTEMS AND COMPUTER PROGRAM PRODUCTS USING BIT PLANE REPRESENTATIONS OF SELECTED SEGMENTS

(75) Inventors: Michael J. Lemen, Durham, NC (US); James S. Fleming, Apex, NC (US); Manuel Aparicio, IV, Chapel Hill, NC (US)

(73) Assignee: Saffron Technology, Inc., Morrisville, NC (US)

( * ) Notice: Subject to any disclaimer, the term of this patent is extended or adjusted under 35 U.S.C. 154(b) by 282 days.

(21) Appl. No.: 11/196,871

(22) Filed: Aug. 4, 2005

(65) Prior Publication Data

US 2007/0033346 A1    Feb. 8, 2007

(51) Int. Cl.
    G06F 13/14        (2006.01)
(52) U.S. Cl. .................. 711/128; 710/68; 708/203; 709/247; 382/232; 382/239; 382/244
(58) Field of Classification Search .............. 711/128; 707/101; 710/68; 709/247; 708/203; 382/232, 382/239, 244; 364/715.02; 341/50; 344/555, 344/204; 370/477, 521
See application file for complete search history.

(56) References Cited

U.S. PATENT DOCUMENTS

| 4,660,166 | A | 4/1987 | Hopfield |
| 6,052,679 | A | 4/2000 | Aparicio, IV et al. |
| 6,581,049 | B1 | 6/2003 | Aparicio, IV et al. |
| 2003/0033265 | A1* | 2/2003 | Cabana et al. ............ 706/15 |
| 2005/0024402 | A1* | 2/2005 | Quintana et al. ............ 347/12 |

OTHER PUBLICATIONS

BitMagic, "Hierarchical Compression" dated on Aug. 18, 2003.*
Aboulnaga et al., "Window Query Processing in Linear Quadtrees", *Distributed and Parallel Databases*, 10:111-126 (2001).
BitMagic, "Hierarchical Compression", accessed Aug. 18, 2003 from http://bmagic.sourceforge.net/hCompression_b.html.
Bookstein et al., "Compression of Correlated Bit-Vectors", *Information Systems*, 16(4):387-400 (1991).
Chapin et al., "Higher Compression From the Burrows-Wheeler Transform by Modified Sorting", *Proceedings of Data Compression Conference*, 1998, IEEE, Mar. 30-Apr. 1, 1998, pp. 532-.

(Continued)

Primary Examiner—Tuan V Thai
Assistant Examiner—Yong Choe
(74) Attorney, Agent, or Firm—Myers Bigel Sibley & Sajovec

(57) ABSTRACT

Associative matrix compression methods, systems, computer program products and data structures compress an association matrix that contains counts that indicate associations among pairs of attributes. Selective bit plane representations of those selected segments of the association matrix that have at least one count is performed, to allow compression. More specifically, a set of segments is generated, a respective one of which defines a subset, greater than one, of the pairs of attributes. Selective identifications of those segments that have at least one count are stored. The at least one count that is associated with a respective identified segment is also stored as at least one bit plane representation. The at least one bit plane representation identifies a value of the at least one associated count for a bit position of the count that corresponds to the associated bit plane.

12 Claims, 31 Drawing Sheets

OTHER PUBLICATIONS

Fleming et al., "Network of Networks of Associative Memory Networks for Knowledge Management", U.S. Appl. No. 10/980,520, filed Nov. 03, 2004.

IBM, Informix Spatial DataBlade Module, accessed Sep. 5, 2003 from http://www-3.ibm.com/software/data/imformix/blades/spatial/rtree.html.

Johnson et al., "Compressing Large Boolean Matrices Using Reordering Techniques", *Proceedings of the 30th VLDB Conference*, Toronto, Canada, 11 pp. (2004).

Matrix Market, "Text File Formats", accessed Feb. 21, 2003 from http://math.nist.gov/MatrixMarket/formats.html.

Oracle Technology Network, "Oracle Spatial Data Sheet", accessed Sep. 5, 2003 from http://otn.oracle.com/products/spatial/htdocs/data_sheet_9i/9iR2_spatial_ds.html.

Scholer et al., "Compression of Inverted Indexes for Fast Query Evaluation", *Proceedings of the 25th Annual International ACM SIGIR Conference on Research and Development in Information Retrieval*, pp. 222-229 (2002).

Shekhar et al., "Spatial Databases-Accomplishments and Research Needs", *IEEE Transactions on Knowledge and Data Engineering*, 11(1):45-55 (1999).

Signal Processing Institute, "Quad-tree decomposition", accessed Aug. 18, 2003 from http://Itswww.epf.ch/pub_files/brigger/thesis_html/node21.html.

Skopal et al., "Properties of Space Filling Curves and Usage With UB-Trees", *ITAT 2002: Information Technologies—Applications and Theory, Workshop on Theory and Practice of Information Technologies, Proceedings*, pp. 155-166 (2002).

Smith, "Data Compression", *The Scientist and Engineer's Guide to Digital Signal Proceesing*, California Technical Publishing, pp. 481-502 (1997).

Taubman et al., "Embedded Block Coding in JPEG2000", Hewlett-Packard, pp. 1-36 (2001).

Taubman et al., "Embedded Block Coding in JPEG2000", *IEEE 2000 International Conference on Image Processing*, 2:33-36 (2000).

Taubman, "High Performance Scalable Image Compression with EBCOT", *IEEE Transactions on Image Processing*, 9(7):1158-1170 (2000).

Williams et al., "Compression of Nucleotide Databases for Fast Searching", Bioinformatics, 13:549-554 (1997).

Wu, "Image Compression (3) Wavelet Coding & Vector Quantization", *ENEE631 Digital Image Processing* (Fall '01), 7 pp.

Ziviani et al., "Adding Compression to Next-Generation Text Retrieval Systems", In: Zelkowitz (Ed.) *Advances in Computers: Information Repositories*, Academic Press, 57:171-204 (2003).

Ziviani et al., "Compression: A Key for Next-Generation Text Retrieval Systems", *Computer*, 33(11):37-44 (2000).

International Search Report and Written Opinion for PCT/US2006/029838; date of mailing Feb. 11, 2008.

A. Moffat, J. Zobel, "Parameterised Compression for Sparse Bitmaps," Proceedings of the 15th Annual Internatinoal ACM Sigir Conference on Research and Development in Information Retrieval, 1992, pp. 274-285, http://dx.doi.org/10.1145/133160.13321.

A. Bookstein, S.T. Klein, "Compression of Correlated Bit-Vectors," Information Systems, vol. 16, No. 4, 1991, pp. 387-4000, http://dx.doi.org/10.1016/01306-4379.

A. Garratt, M. Jackson, P. Burden, J. Wallis, "A Survey of alternative Designs for a Search Engine Storage Structure," Information and Software Technology, vol. 43, No. 11, Aug. 25, 2001, pp. 661-677, http://dx.doi.org/10.1016/S0950-5849.

P. Franti, "Lecture Notes: Image Compression 'A Picture Takes More than Thousand Bytes," Sep. 9, 2002, http://cs.joensuu.fi/pages/frantic/imag/ecomp/comp.doc.

Communication Pursuant to Article 94(3) EPC for European Application No. 06 789-052.5—1225; dated Jan. 28, 2009.

Rinfret; Term Matching and Bit-Sliced Index Arithemetic, pp. 1-21 & 37-48 (sent as XP007906781, XP007906782 & XP007906784); 2002.

Sinha et al; Proceedings of ICIP'97, vol. 2, pp. 871-873; 1997.

\* cited by examiner

Example input data:

John and Mary went to New York.

The above sentence will produce a Context with the following attributes:

| Attribute Key | Attribute Value |
|---|---|
| Person | John |
| Person | Mary |
| City | New York |

FIG. 4

Contexts are observed into an Association Matrix where Attributes are co-associated with every other Attribute within the same Context.

| Attribute Key | Attribute Value |
|---|---|
| Person | John |
| Person | Mary |
| City | New York |

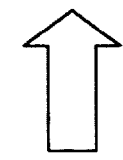

|  | John | Mary | New York |
|---|---|---|---|
| John |  | 1 | 1 |
| Mary | 1 |  | 1 |
| New York | 1 | 1 |  |

FIG. 5A

If another context was observed into the same Association Matrix the result will be:

| Attribute Key | Attribute Value |
|---|---|
| Person | John |
| Person | Mary |
| City | Seattle |

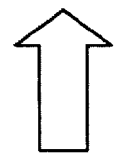

|  | John | Mary | New York | Seattle |
|---|---|---|---|---|
| John |  | 2 | 1 | 1 |
| Mary | 2 |  | 1 | 1 |
| New York | 1 | 1 |  |  |
| Seattle | 1 | 1 |  |  |

FIG. 5B

Example:

a value of 5 would contain data in the $0^{th}$ and $2^{nd}$ bit plane.
5 => (0101 binary) => data on the $0^{th}$ bit plane, no data on the $1^{st}$ bit plane, data on the $2^{nd}$ bit plane.

Example: (4 bits Map and 4 bits Plane Data => therefore Segment spans 16 counts)
plane[0] = 1011 0000 0000 0110
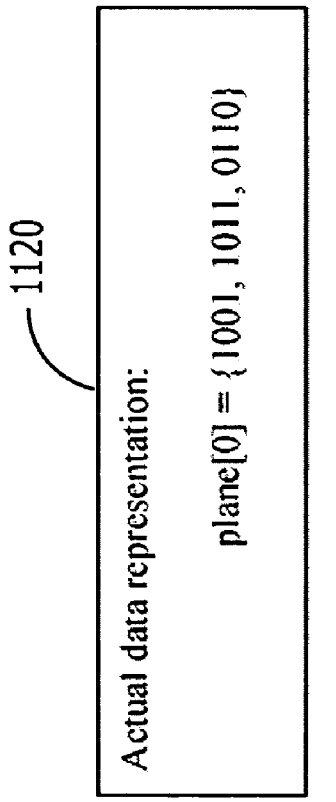
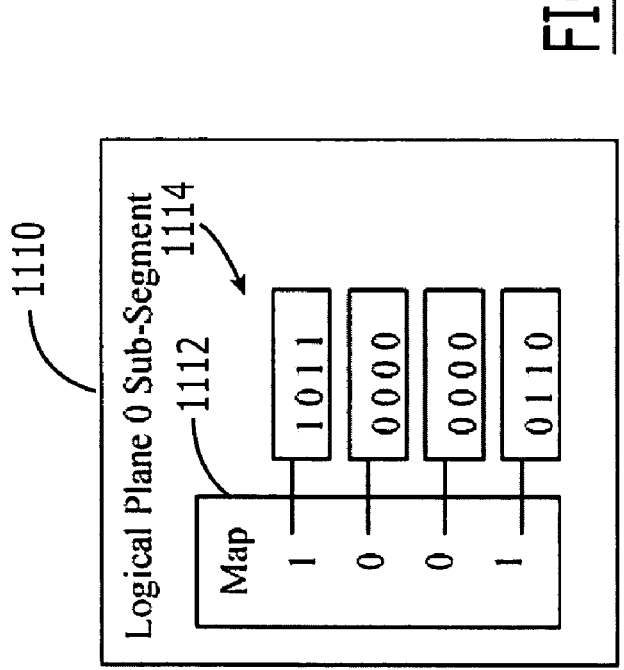
FIG. 11

| Segment # | Data |
|---|---|
| 0 | 0-0-0-0-0-0-0-0-0-0-0-0-0-0 |
| ⋮ | |
| 1056784 | 0-0-2-0-0-0-0-0-0-0-0-0-0-0 |
| ⋮ | |
| 1056832 | 0-0-0-0-0-1-1-0-0-0-0-0-0-0 |
| ⋮ | |
| 1060880 | 0-2-0-0-0-0-0-0-0-0-0-0-0-0 |
| ⋮ | |
| 1060928 | 0-0-0-0-0-1-1-0-0-0-0-0-0-0 |
| ⋮ | |
| 4214800 | 0-1-1-0-0-0-0-0-0-0-0-0-0-0 |
| ⋮ | |
| 4218896 | 0-1-1-0-0-0-0-0-0-0-0-0-0-0 |
| ⋮ | |

FIG. 12

| Segment # | Data |
|---|---|
| 1056784 | 0-0-2-0-0-0-0-0-0-0-0-0-0-0 |
| 1056832 | 0-0-0-0-0-1-1-0-0-0-0-0-0-0-0-0 |
| 1060880 | 0-2-0-0-0-0-0-0-0-0-0-0-0-0-0-0 |
| 1060928 | 0-0-0-0-0-1-1-0-0-0-0-0-0-0-0-0 |
| 4214800 | 0-1-1-0-0-0-0-0-0-0-0-0-0-0-0-0 |
| 4218896 | 0-1-1-0-0-0-0-0-0-0-0-0-0-0-0-0 |

FIG. 13

|  | John | Mary | New York | Seattle |
|---|---|---|---|---|
| John |  | 2 | 1 | 1 |
| Mary | 2 |  | 1 | 1 |
| New York | 1 | 1 |  |  |
| Seattle | 1 | 1 |  |  |

Internal Attribute: (16 bit example)

Person:John = 1:2 = 0102 Hex = 258

Person:Mary = 1:3 = 0103 Hex = 259

City:New York = 4:5 = 0405 Hex = 1029

City:Seattle = 4:6 = 0406 Hex = 1030

FIG. 18

| InternalAttr | Row/Col |
|---|---|
| 258 | 0 |
| 259 | 1 |
| 1029 | 2 |
| 1030 | 3 |

| InternalAttr | 0 | 1 | 2 | 3 |
|---|---|---|---|---|
| 0 | | | | |
| 1 | 2 | | | |
| 2 | 1 | 1 | | |
| 3 | 1 | 1 | | |

FIG. 19

| Segment # | Data |
|---|---|
| 1 | 2-1-1-1-0-0-0-0-0-0-0-0-0-0 |

FIG. 20

ASSOCIATIVE MATRIX METHODS, SYSTEMS AND COMPUTER PROGRAM PRODUCTS USING BIT PLANE REPRESENTATIONS OF SELECTED SEGMENTS

FIELD OF THE INVENTION

This invention relates to knowledge management systems, methods and computer program products, and more particularly to associative memory systems, methods and computer program products.

BACKGROUND OF THE INVENTION

Associative memories, also referred to as content addressable memories, are widely used in the field of pattern matching and identification, expert systems and artificial intelligence. A widely used associative memory is the Hopfield artificial neural network. Hopfield artificial neural networks are described, for example, in U.S. Pat. No. 4,660,166 to Hopfield entitled Electronic Network for Collective Decision Based on Large Number of Connections Between Signals.

Although associative memories may avoid problems in prior back-propagation networks, associative memories may present problems of scaling and spurious memories. Recent improvements in associative memories have attempted to solve these and other problems. For example, U.S. Pat. No. 6,052,679 to coinventor Aparicio, IV et al., entitled *Artificial Neural Networks Including Boolean-Complete Compartments* provides a plurality of artificial neurons and a plurality of Boolean-complete compartments, a respective one of which couples a respective pair of artificial neurons. By providing Boolean-complete compartments, spurious complement memories can be avoided.

Unfortunately, there may be a fundamental scaling problem that can limit the use of associative memories to solve real world problems. In particular, many associative memories scale geometrically as a function of the number of inputs. This geometric scaling may be unreasonable to support applications at the scale of complexity that warrants such technology.

Scaling in associative memories is addressed in U.S. Pat. No. 6,581,049 to coinventor Aparicio, IV et al., entitled *Artificial Neurons Including Power Series of Weights and Counts That Represent Prior and Next Associations*, and assigned to the assignee of the present invention, the disclosure of which is hereby incorporated herein by reference in its entirety as if set forth fully herein. As described in U.S. Pat. No. 6,581,049, an artificial neuron includes a plurality of inputs and a plurality of dendrites, a respective one of which is associated with a respective one of the plurality of inputs. Each dendrite comprises a power series of weights, and each weight in a power series includes an associated count for the associated power. By representing the weights as a power series, resource consumption can be reduced. Large numbers of inputs may be handled using real world systems, to thereby solve real world applications. Also see Published U.S. Patent Application No. 2003/0033265 A1 to Cabana et al., entitled Artificial Neurons Including Weights That Define Maximal Projections, published Feb. 13, 2003, and assigned to the assignee of the present invention, the disclosure of which is hereby incorporated herein by reference in its entirety as if set forth fully herein.

Notwithstanding the techniques described in U.S. Pat. No. 6,581,049 and U.S. Published Application 2003/0033265 A1, there continues to be a need to provide associative memory systems, methods and computer program products that can allow lossless compression of large association matrices, while still allowing random access observation (writing) of new associations and random access imagining (reading) from stored associations.

SUMMARY OF THE INVENTION

Associative matrix methods, systems, computer program products and data structures according to exemplary embodiments of the present invention, compress an association matrix that contains a plurality of counts that indicate associations among a plurality of pairs of attributes. According to some embodiments of the present invention, selective bit plane representations of those selected segments of the association matrix that have at least one count associated therewith is performed, to allow compression. More specifically, according to some embodiments of the invention, a set of segments is generated, a respective one of which defines a subset, greater than one, of the plurality of pairs of attributes. Selected identifications of those segments that have at least one count that is associated therewith are stored. The at least one count that is associated with a respective identified segment is also stored as at least one bit plane representation. The at least one bit plane representation identifies a value of the at least one associated count for a bit position of the count that corresponds to the associated bit plane.

According to other embodiments of the present invention, storing the at least one count that is associated with a respective identified segment as at least one bit plane representation may be performed by splitting the at least one count that is associated with a respective identified segment into a plurality of bit planes. At least one of the bit planes that has non-zero bit plane data associated therewith is identified. A map is generated that identifies a position of the non-zero bit plane data in the at least one bit plane that has non-zero bit plane data associated therewith. At least one representation of the non-zero bit plane data that is associated with the at least one bit plane that was identified is generated. The map and the at least one representation of the non-zero bit plane data is then stored.

Further compression may be provided, according to other embodiments of the present invention, by reorganizing the selected identifications of these segments that have at least one count that is associated therewith into a continuous range. Then, at least one count that is associated with a respective segment of the continuous range is stored as at least one bit plane representation, as was described above. The at least one count may be stored according to embodiments that were described above.

Associations may be observed into an association matrix according to exemplary embodiments of the present invention, by adding an association among observed attributes to the at least bit plane representation that corresponds to the observed attributes, if the observed attributes exist in the identification of segments of the association matrix that have at least one count that is associated therewith. At least one bit plane representation for the observed attributes is created, if the observed attributes do not exist in the identification of segments of the association matrix that have at least one count that is associated therewith.

Moreover, associations can be imagined from an association matrix according to exemplary embodiments of the present invention, by obtaining the at least one bit plane representation that corresponds to the selected attributes in the compressed association matrix, and by converting the at least one bit plane representation that was obtained to a count that identifies associations among the selected attributes.

It will be understood that embodiments of the invention have been described above primarily with respect to method embodiments. However, analogous system embodiments and/or analogous computer program product embodiments also may be provided. Analogous data structures for an association matrix also may be provided.

BRIEF DESCRIPTION OF THE DRAWINGS

FIGS. 4-21 are block diagrams of exemplary embodiments of the present invention that provide an intermediate level description, along with examples thereof.

DETAILED DESCRIPTION

Figure 1:
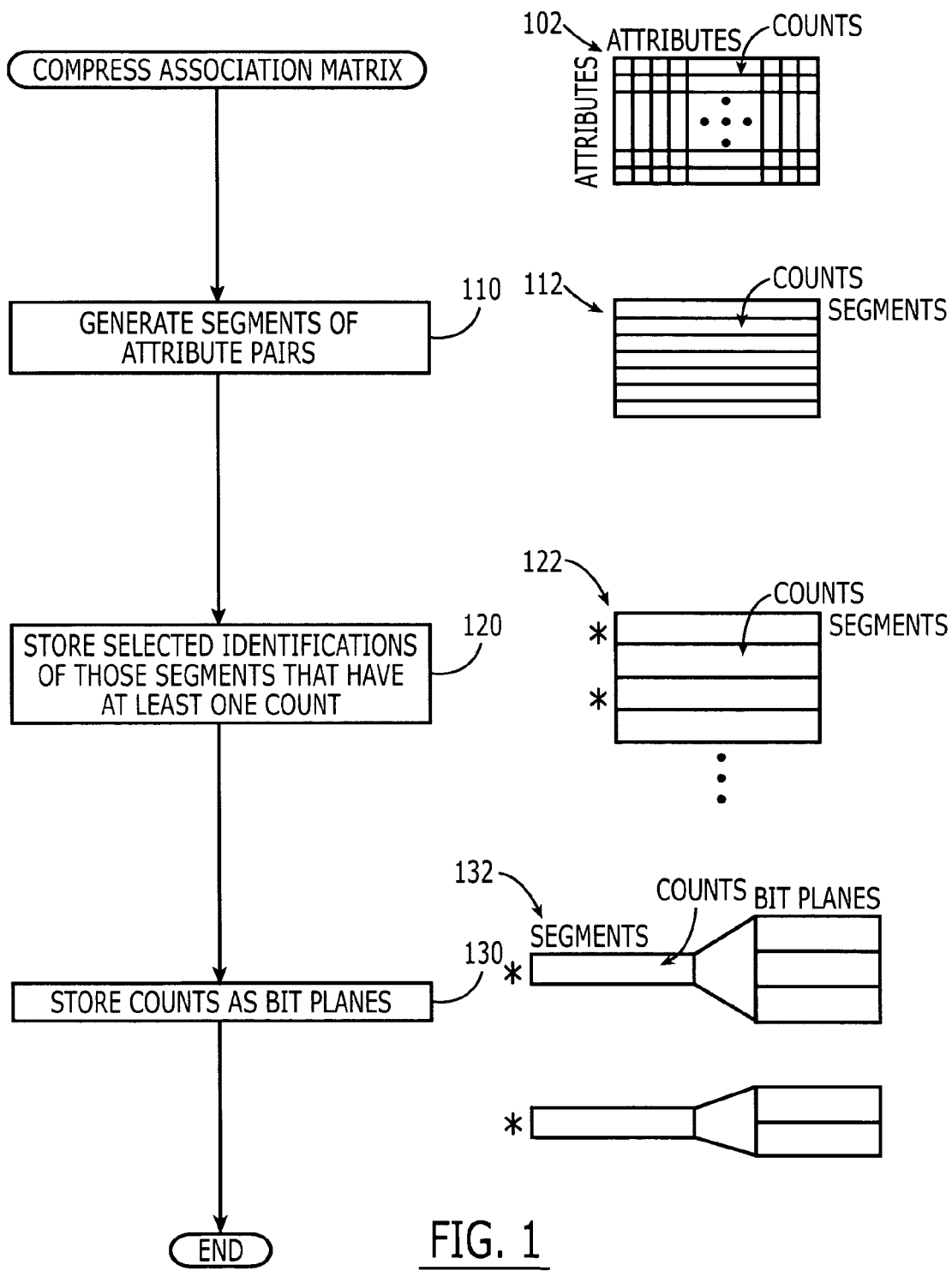
FIGS. 1-3 are flowcharts of operations that may be performed to compress an association matrix according to exemplary embodiments of the present invention, along with examples thereof.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams and flowcharts of methods, systems and computer program products according to embodiments of the invention. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

It will also be understood that associative matrix compression methods, systems, data structures and computer program products according to various embodiments of the present invention may be embodied in one or more enterprise, application, personal, pervasive and/or embedded computer systems that may be connected by a wired and/or wireless network. The systems, methods, data structures and/or computer program products may also include one or more general purpose data processors that execute one more stored programs, special processors and/or special purpose hardware. Moreover, the associative matrix data structures may be stored in one or more general purpose memory devices and/or special purpose memory devices. These memory devices may represent an overall hierarchy of memory devices containing software and/or data used to implement embodiments of the present invention. The memory can include, but is not limited to, the following types of devices: cache, ROM, PROM, EPROM, EEPROM, flash memory, SRAM and/or DRAM.

Figure 2:
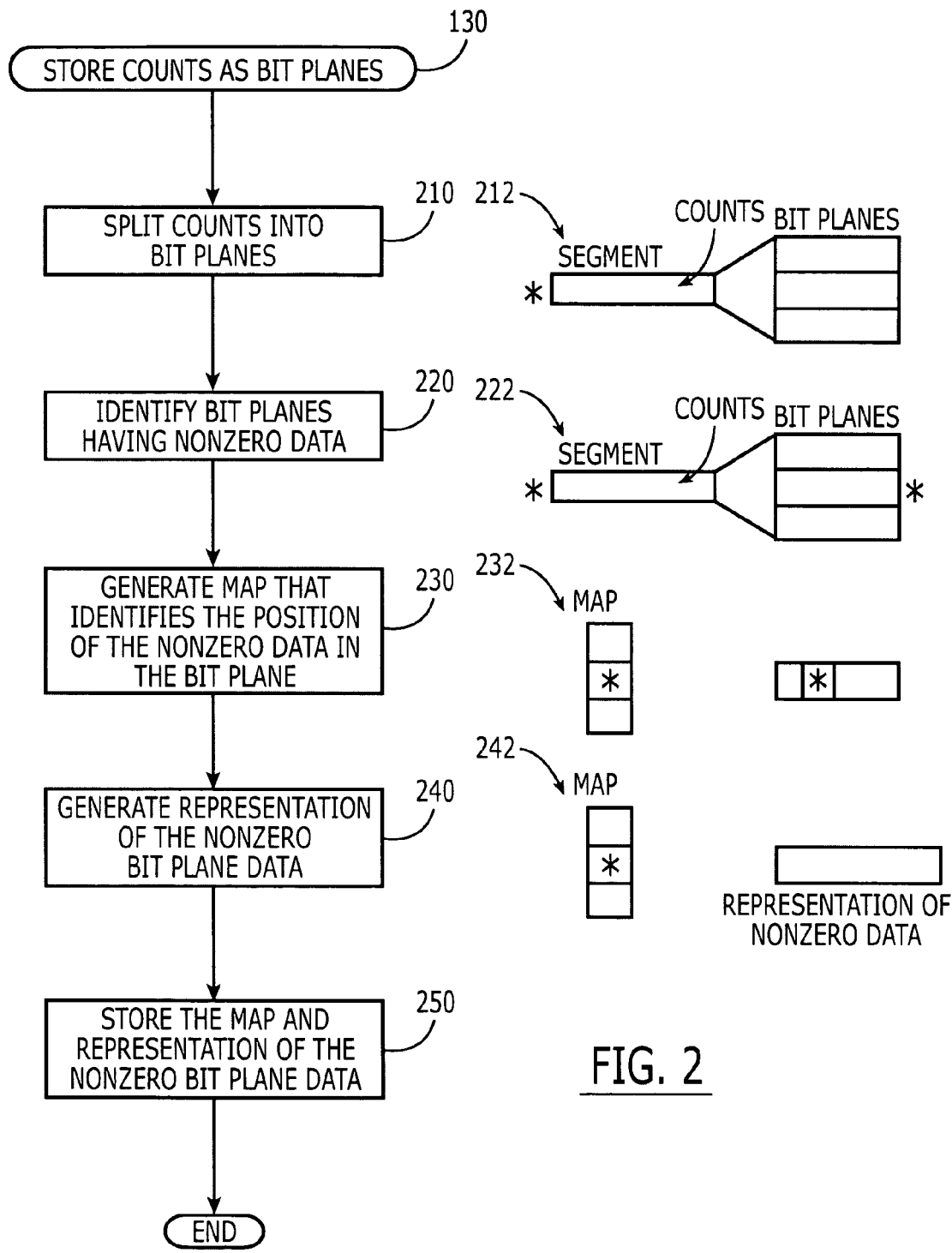
Figure 3:
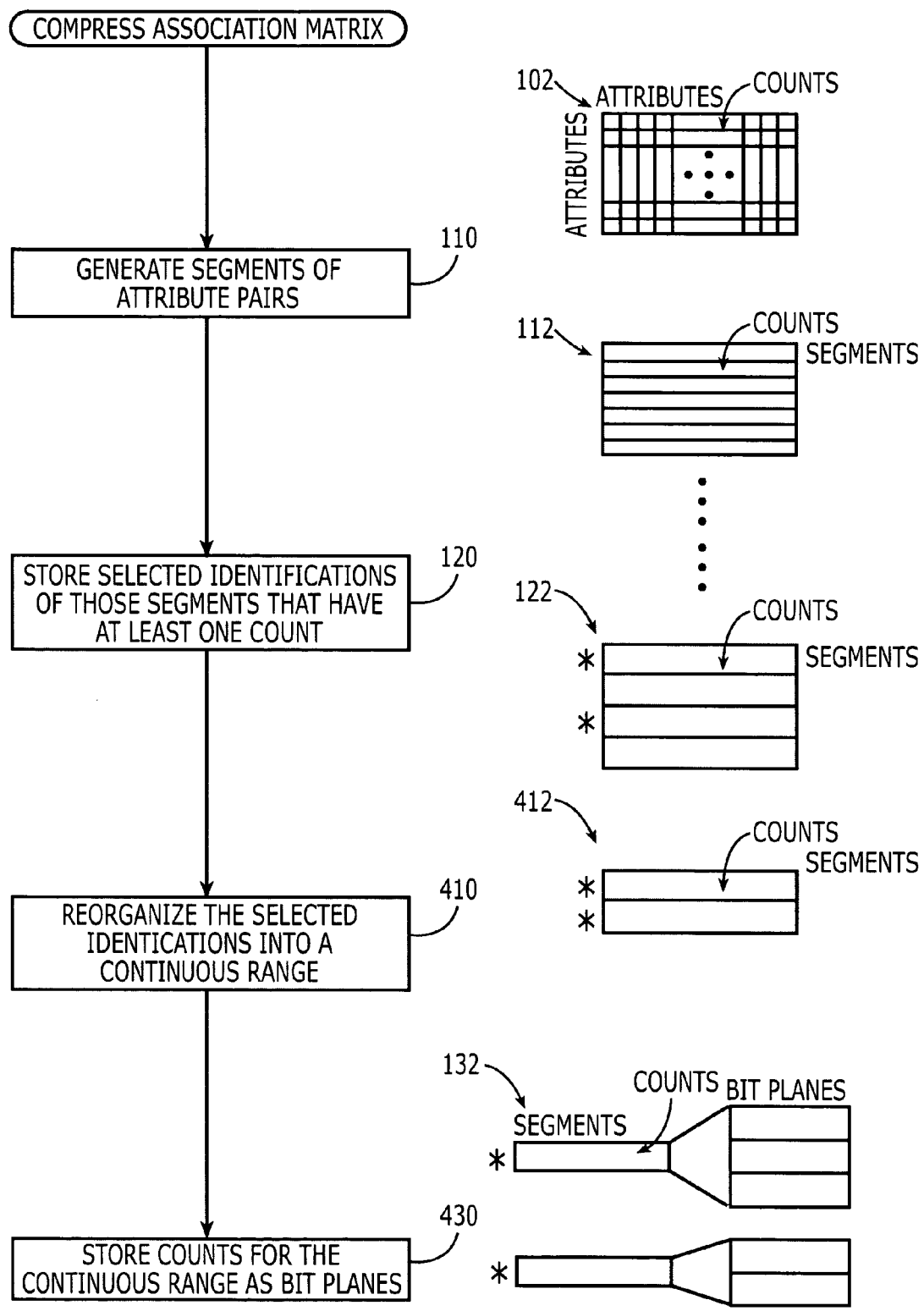

In order to provide a complete description of the present invention, FIGS. 1-3 will provide a high level overview of exemplary embodiments of the present invention. FIGS. 4-21 will then provide an intermediate level description including multiple illustrative examples. Finally, FIGS. 22-32 will provide flowcharts that describe detailed operations according to exemplary embodiments of the present invention.

FIG. 1 is a flowchart of operations that may be performed to compress an association matrix according to exemplary embodiments of the present invention, as well as simplified examples of these operations.

Referring to FIG. 1, operations to compress an association matrix are described. As shown in Block 102, the association matrix contains a plurality of counts that indicate associations among a plurality of pairs of attributes. An association matrix also may be referred to as an associative matrix, an associative memory, or a content addressable memory.

Referring to Block 110, a set of segments is generated, a respective one of which defines a subset, greater than one, of the plurality of pairs of attributes. An example of the segments is shown at Block 112. In some embodiments, a segment may correspond to a row of the association matrix 102. In other embodiments, however, a segment may correspond to a portion of a row, more than one row and/or may be based upon columns. The segments need not be of the same size. Moreover, the entire association matrix need not be divided into segments of more than one attribute pair. In particular, some parts of the association matrix need not be divided into segments and/or some segments may correspond to single attribute pairs.

Then, at Block 120, identifications of those segments that have at least one count that is associated therewith are stored. These identifications are indicated by asterisks at Block 122. Thus, as shown in Block 122, if only the first and third segments have counts associated therewith, only the first and third segments may be identified.

Finally, at Block 130, the at least one count that is associated with a respective identified segment is stored as at least one bit plane representation. Thus, as shown at Block 132, for those segments that have counts, the counts are stored as one or more bit plane presentations. The bit plane representations identify a value of the at least one associated count for a bit position of the count that corresponds to the associated bit plane. For example, if a given count has a value in the zero bit plane, that value is stored at the appropriate bit position in the zero bit plane. As shown in Block 132, the number of bit planes need not be the same for each segment, but may vary based on the values of the at least one count that is associated with the segment.

Accordingly, FIG. 1 also illustrates compressing an association matrix according to exemplary embodiments of the present invention, by selectively bit planing those segments of the association matrix that have at least one count associated therewith, along with an identification of the segments that have been selectively bit planed. By storing the identifications of those segments that have at least one count that is associated therewith and by storing the at least one count in a bit plane representation, a large association matrix may be stored in compressed form according to exemplary embodiments of the present invention. Lossy compression need not be performed, so that the count values can be accurately observed and imagined, not with standing the compressed storage of the association matrix.

FIG. 2 is a flowchart of exemplary embodiments of the invention for storing counts as bit planes, which may correspond to Block 130 of FIG. 1. Simplified examples are also provided.

More specifically, at Block 210, the at least one count that is associated with the respective identified segment is split into a plurality of bit planes. This splitting of the identified segment (shown by an asterisk) into bit planes, is shown at Block 212. Then, at Block 220, at least one of the bit planes that has non-zero bit plane data associated therewith is identified, as indicated by the asterisk for the second bit plane at Block 222.

Then, at Block 230, a map that identifies a position of the non-zero bit plane data in the at least one bit plane that has non-zero bit plane data associated therewith is generated. For example, as shown at Block 232, the map identifies the second position as containing non-zero bit plane data, shown by an asterisk in the map of Block 232. At Block 240, at least one representation of the non-zero bit plane data that is associated with the at least one bit plane that was identified is generated, as illustrated at Block 242. Finally, at Block 250, the map and the at least one representation of the non-zero bit plane data are stored. Thus, where counts are present, bit planes are created to allow efficient storage.

Embodiments of the invention that were described in FIG. 1 may be used where the association matrix 102 contains relatively large numbers of counts that are widely distributed over the matrix (referred to herein as a large matrix). In other embodiments of the invention, when there are a relatively small number of counts (referred to herein as a small matrix), embodiments of FIG. 3 may be used to allow even greater efficiency of compression. It will be understood that embodiments of FIG. 3 also may be used with any kind of count distribution, and may be combined with embodiments of FIG. 1.

Thus, referring to FIG. 3, the operations of Blocks 110 and 120 of FIG. 1 are performed. At Block 410, the identifications of those segments that have at least one count that is associated therewith are reorganized into a continuous range. The continuous range is shown at Block 412 by the two asterisked segments being placed adjacent to one another. Operations similar to Block 130 may then be performed at Block 430 by storing the at least one count that is associated with a respective one of the continuous range as at least one bit plane representation. The detailed operations of Block 430 may be embodied as was already described in FIG. 2 in connection with Block 130.

An intermediate level description of the invention along with representative examples will now be provided in FIGS. 4-21. FIG. 4 illustrates how a context may be built according to exemplary embodiments of the present invention. As used herein, a "context" means a relationship between attributes in a document or other input data to be stored (observed) in an association matrix. Moreover, as used herein, an "attribute" is any data term and/or concept in a document or other input data that is being stored (observed) in an association matrix. Attributes may include persons, places, things, verbs and/or other data terms and/or concepts of potential interest. As shown in FIG. 4, for the example input data "John and Mary went to New York", a context is produced with the attributes Person:John; Person:Mary; and City:New York. In embodiments of FIG. 4, the attributes are expressed in terms of an attribute key (such as person, city, etc.) and an attribute value (such as John, Mary and New York).

Referring now to FIG. 5A, the contexts are observed into an association matrix 500 (which may correspond to association matrix 102 of FIGS. 1 and/or 3) where the attributes are co-associated with every other attribute within the same context. FIG. 5B illustrates another context that is observed into the same association matrix 500, based on the input data "John and Mary went to Seattle".

Figure 6:
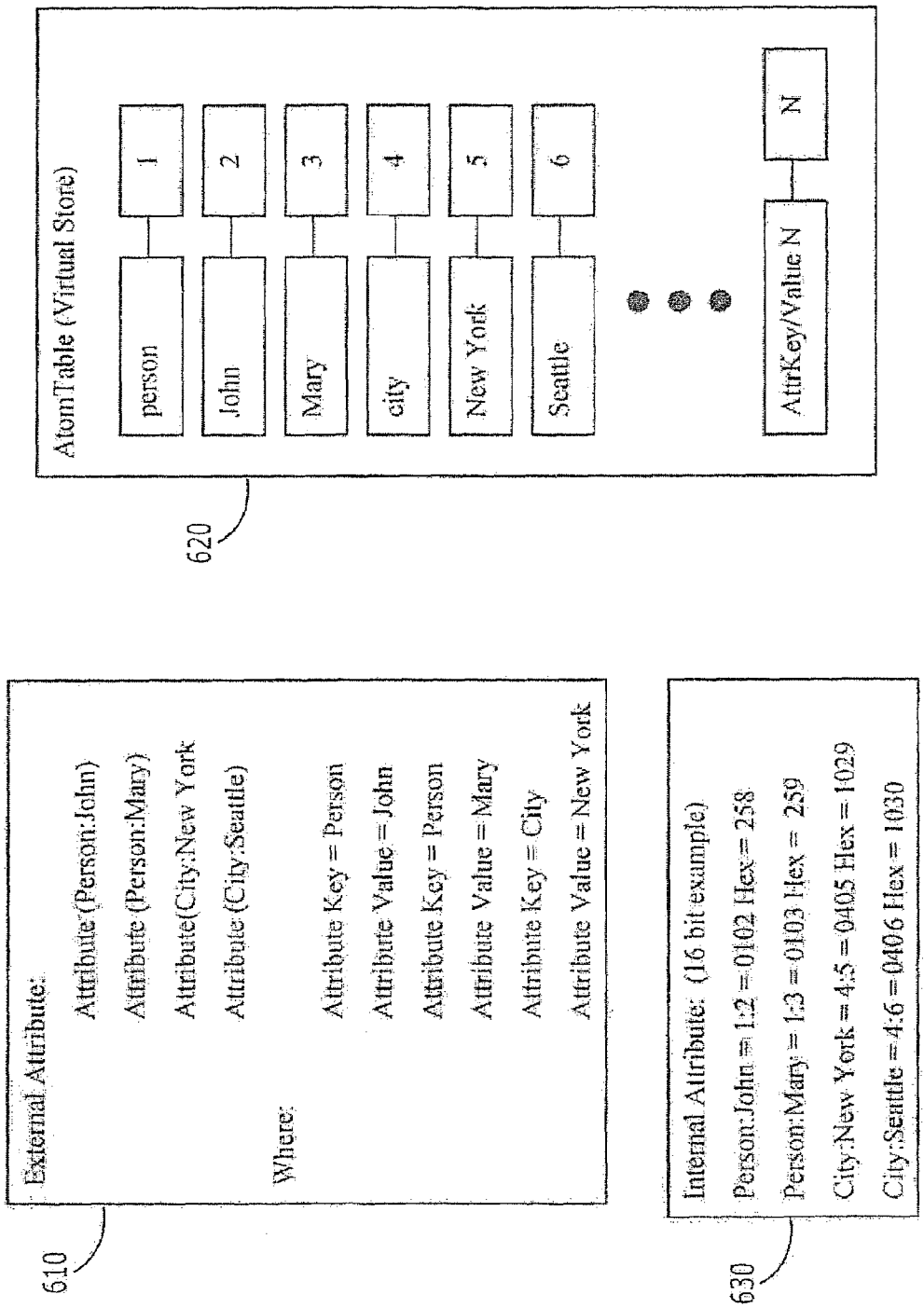

FIG. 6 illustrates how an attribute can be converted into an internal representation. The external attributes from the examples of FIGS. 5A and 5B are illustrated in Block 610. Block 620 illustrates how each attribute key or value can be assigned a numerical representation. Block 630 illustrates how these numeric representations can then be used to represent each Key:Value by a four place hexadecimal number, which corresponds to 16 bits. Other representations also can be used.

Figure 7:
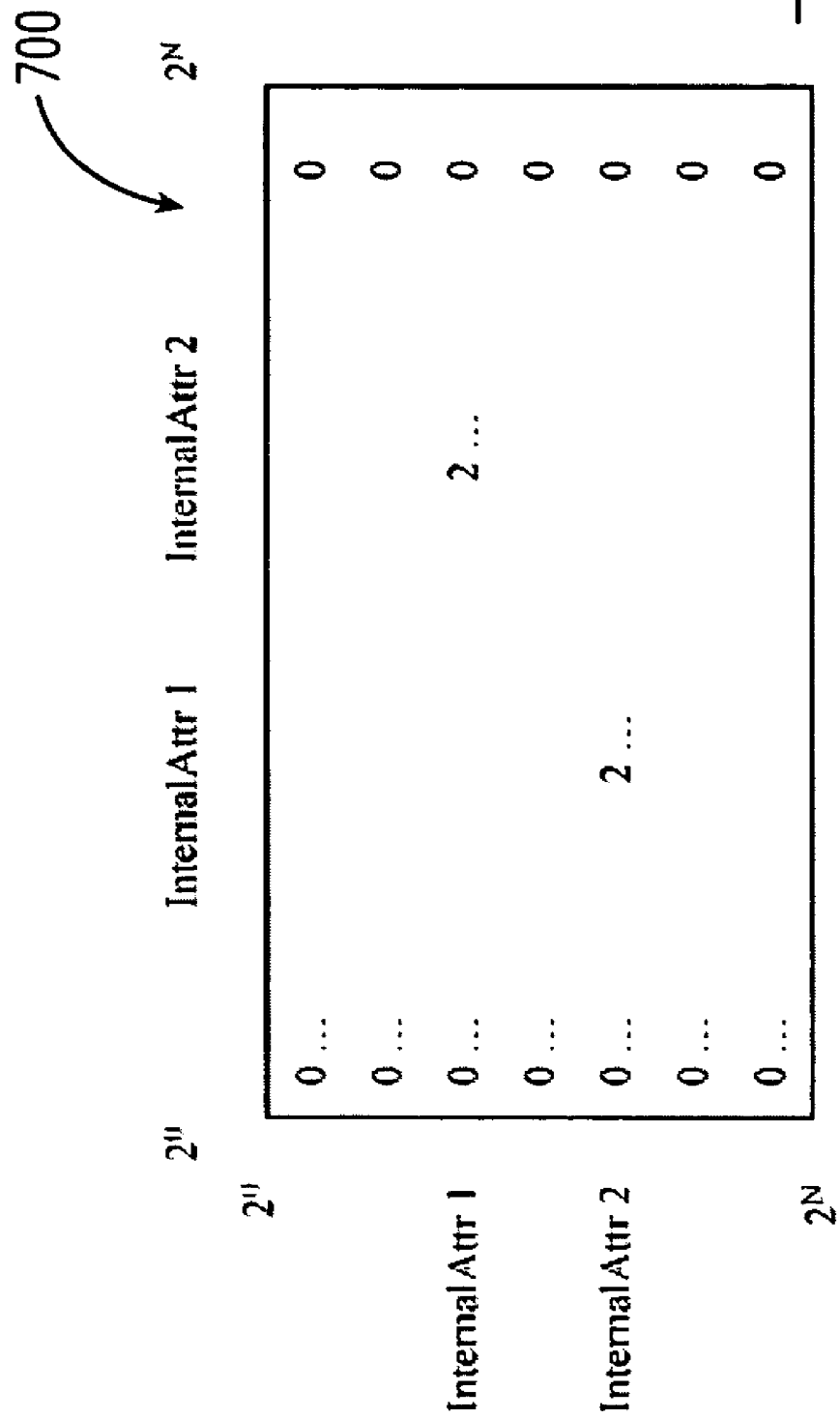
Figure 8:
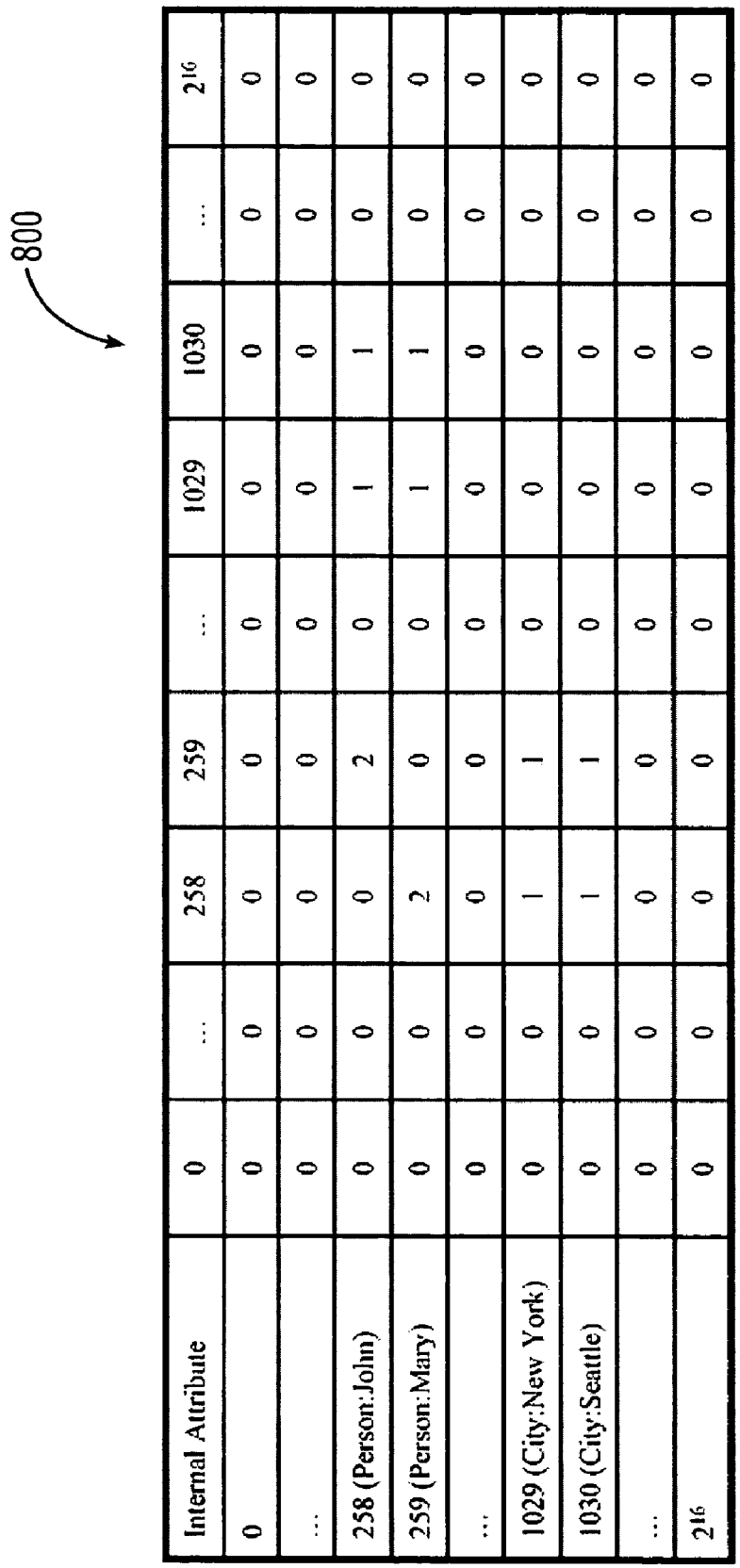

Referring now to FIG. 7, the internal attributes, such as the internal attributes of Block 630, then are observed into a large association matrix 700. As used herein, a large association matrix defines a $2^N \times 2^N$ matrix, where the indices are N bit internal attributes. By using the internal attributes as indices, a natural order of the association counts can be provided. FIG. 7 illustrates a generalized example of an association matrix 700 for N bit internal attributes. FIG. 8 illustrates a large association matrix 800 with $2^{16} \times 2^{16}$ cells, wherein the examples of FIG. 6 have been observed into the matrix 800 as counts. Thus, in FIG. 8, the example context of (Person:John, Person:Mary, City:New York) and (Person:John, Person:Mary, City:Seattle) have been observed into the matrix 800. Thus, FIG. 8 illustrates an association matrix 800 that contains a plurality of counts (illustrated in the example of FIG. 8 by 0s, 1s and 2s) that indicate associations between a plurality of pairs of attributes ($2^{16}$ attributes in FIG. 8), which may correspond to Block 102 of FIGS. 1 and/or 3.

Figure 9:
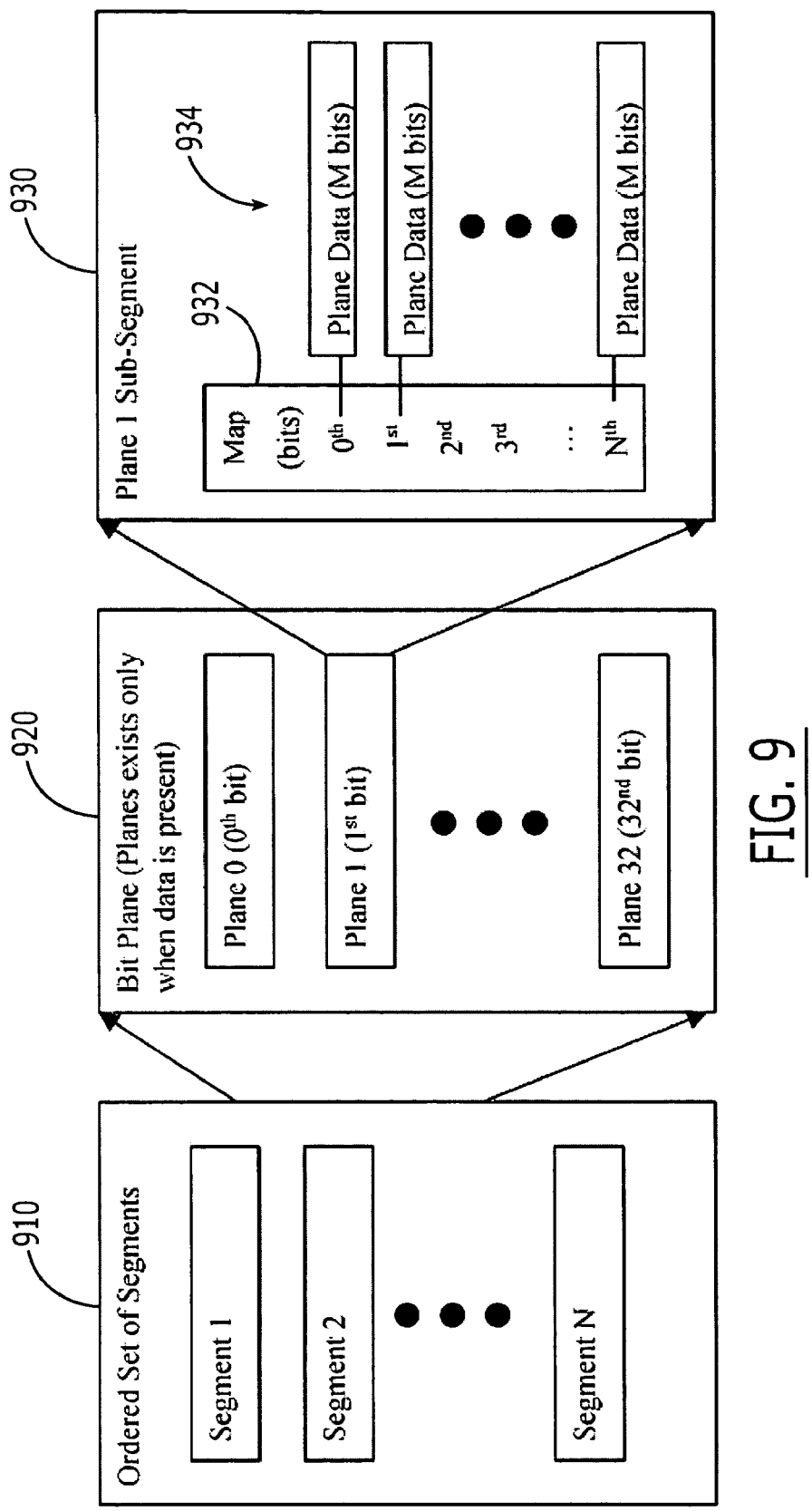

FIG. 9 illustrates an example of generating a set of segments, a respective one of which defines a subset, greater than one, of the plurality of pairs of attributes, which may correspond to Block 110 of FIGS. 1 and/or 3. As shown in FIG. 9, at Block 910, an ordered set of segments, Segment 1 ... Segment N, is generated, a respective on one of which defines a subset, greater than one, of the plurality of pairs of attributes. In FIG. 9, a segment corresponds to N×M counts from the association matrix, where N is the number of map bits and M is the number of bits in the plane data. Thus, Block 910 may correspond to Block 112 of FIGS. 1 and/or 3. It will also be understood that larger and/or smaller segments may be used, that all segments need not be of the same size and that some of the matrix need not be segmented or may use a segment size of one.

Still referring to FIG. 9, Block 920 illustrates storing selected identifications of those segments that have at least one count that is associated therewith, which may correspond to Blocks 120 and/or 122 of FIGS. 1 and/or 3. As shown in Block 920, bit planes may only exist when data is present in the associated segment, so that in the example of FIG. 9, only Segment 2 is identified. Block 920 also illustrates storing at least one count that is associated with a respective identified segment as at least one bit plane representation, where the at least one bit plane representation identifies a value of the at least one associated count for a bit position of the count that corresponds to the associated bit plane, which may correspond to Blocks 130 and/or 132 of FIGS. 1 and/or 3. As shown in Block 920, 32 bit planes may be created in this example, where each bit plane identifies a value of the at least one associated count for a bit position of the count that corresponds to the associated bit plane, for example the $0^{th}$ bit, the $1^{st}$ bit ... the $32^{nd}$ bit.

Still referring to FIG. 9, Block 930 illustrates how the at least one count that is associated with a respective identified segment may be stored as at least one bit plane representation 930, which may correspond to the overall operations of FIG. 2. As shown in Block 920, the counts are split into bit planes, which may correspond to Blocks 210 and/or 212 of FIG. 2. Moreover, as shown in Block 930, only those bit planes 934 having non-zero bit plane data associated therewith are identified, which may correspond to Blocks 220 and/or 222 of FIG. 2. Moreover, a map 932 is generated that identifies a position of the non-zero bit plane data in the at least one bit plane having non-zero bit plane data, which may correspond to Blocks 230 and/or 232 of FIG. 2. Thus, the map 930 and the representations 934 of the non-zero bit plane data, which may correspond to Blocks 240 and/or 242 of FIG. 2, may be stored to provide storage of the association matrix in compressed form, which may correspond to Block 250 of FIG. 2.

Figure 10:
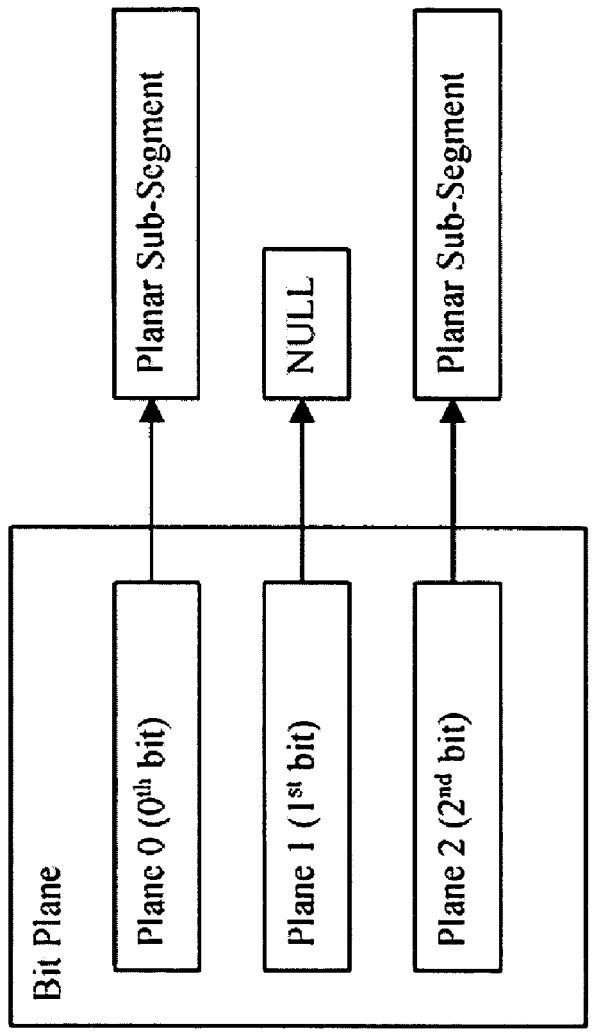

FIG. 10 elaborates on Block 920 of FIG. 9 by providing a specific example of a bit plane of Block 920 of FIG. 9. As shown in FIG. 10, the bit plane may be considered as an array of planar sub-segments, where each planar sub-segment structure contains data when the binary representations for the count has a 1 for that given bit. In some embodiments, the bit plane only contains planar sub-segments up to the highest count for that segment. Thus, as shown in FIG. 10, if the highest count for a segment is 5, the bit plane will have planar sub-segments for the $0^{th}$, $1^{st}$ and $2^{nd}$ planes. It will not have planar sub-segments for the $3^{rd}$ to the $31^{st}$ planes. More specifically, the count of 5 corresponds to 0101 binary, which means there is non-zero data in the $0^{th}$ bit plane, zero data in the $1^{st}$ bit plane, non-zero data in the $2^{nd}$ bit plane and zero data in any higher bit planes.

FIG. 11 provides a more detailed example of a planar sub-segment structure of FIG. 10, which may also correspond to Block 930 of FIG. 9. In some embodiments of the present invention, the planar sub-segment structure includes one bit-masked lookup map 1112 and one or more plane data 1114. The plane data 1114 includes information if the corresponding association count contains a 1 for that plane. The actual representation for that data can only list plane data that contains non-zero values. In some embodiments, as shown in Block 1120, the map 1112 is stored in the $0^{th}$ location in the given plane and the next least significant bit of the plane corresponds to the actual next plane data. Thus, FIG. 11 illustrates an example of identifying at least one of the bit planes that has non-zero bit plane data associated therewith (which may correspond to Block 220 of FIG. 2), generating a map that identifies a position of the non-zero bit plane data in the at least one bit plane that has non-zero bit plane data (which may correspond to Block 230 of FIG. 2), and generating at least one representation of the non-zero bit plane data that is associated with the at least one bit plane that was identified (which may correspond to Block 240 of FIG. 2). Finally, FIG. 11 illustrates storing the map and the at least one representation of the non-zero bit plane data at Block 1120, which may correspond to Block 250 of FIG. 2.

FIG. 12 provides yet another example of partitioning or dividing a large association matrix into segments, which may correspond to Blocks 110 and/or 112 of FIGS. 1 and/or 3. The example corresponds to the large association matrix of FIG. 8. As shown in FIG. 12, the large association matrix is written as a stream of data. The data is segmented into segments of 16 counts (where a number of map bits are 4 and the number of plane data bits are 4). In this example, the entire $2^{16} \times 2^{16}$ association matrix is broken up into 268,435,456 segments of 16 counts, shown in FIG. 12.

FIG. 13 illustrates the storing of the selected identifications of those segments that have at least one count that is associated therewith, which may correspond to Blocks 120 and/or 122 of FIGS. 1 and/or 3. In particular, as shown in FIG. 13, the planar segment structure need only track those segments which contain non-zero data, so that the association matrix of FIG. 12 may be divided into the segments shown in FIG. 13.

Figure 14:
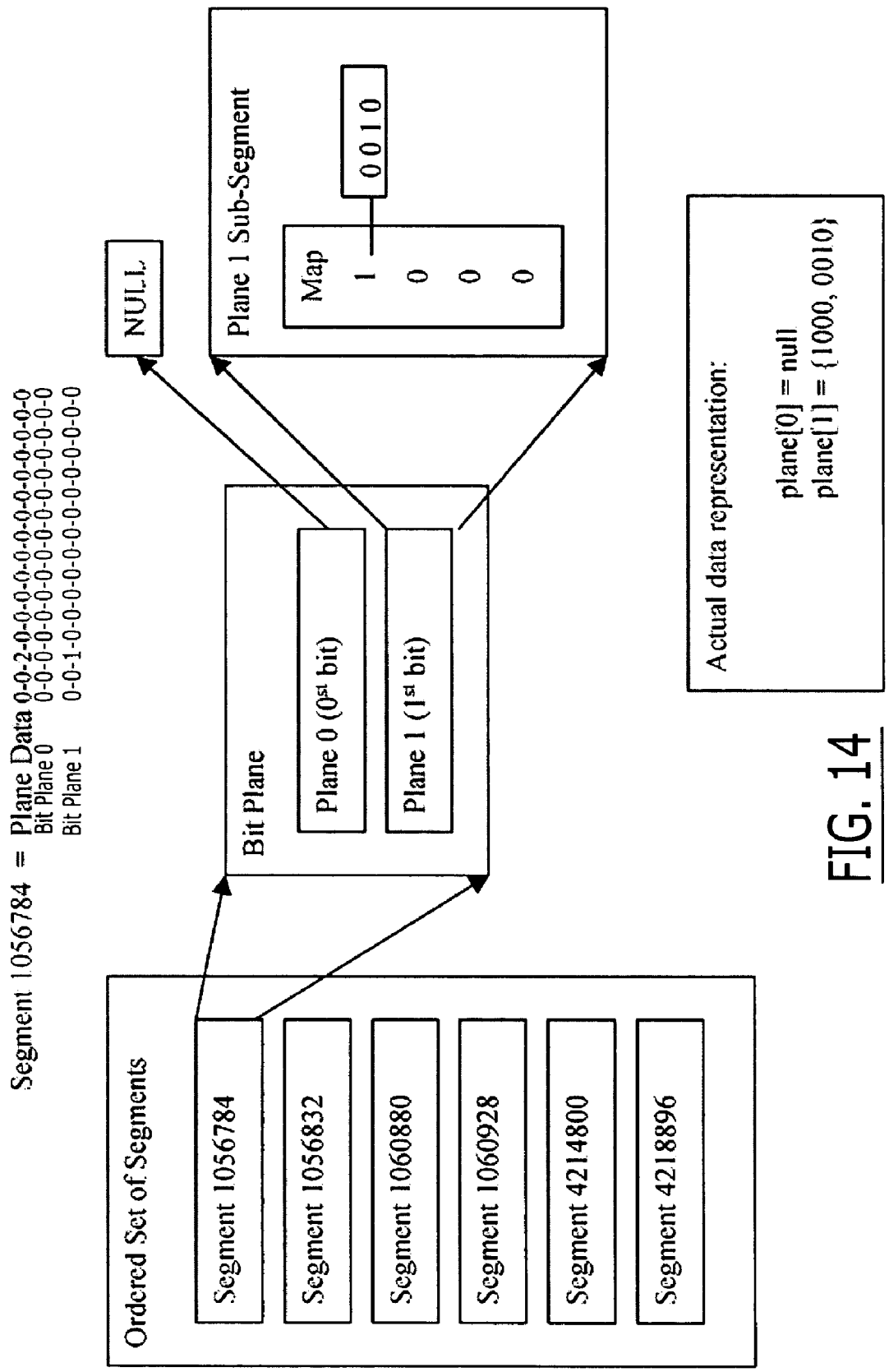

FIG. 14 illustrates how the counts may be stored as bit planes (which may correspond to Blocks 130 and/or 132 of FIGS. 1 and/or 3) for the segment 1,056,784 of FIG. 13. As also shown, the plane data for this segment splits into a bit plane 0, which is null, and a bit plane 1, which has a 1 in the third bit position to signify the count of 2. The null $0^{th}$ bit plane need not be stored. The first bit plane, which has a value of 1 (signifying a count of 2), in the third position, is stored by generating a map (1000) indicating there is data in the first sub-segment (i.e., a position of the non-zero bit plane data) and by storing the data itself (0010). Thus, as the actual data presentation shown for segment 1,056,784 is that plane 0 is null and plane 1 has the data 1000, 0010.

Figure 15:
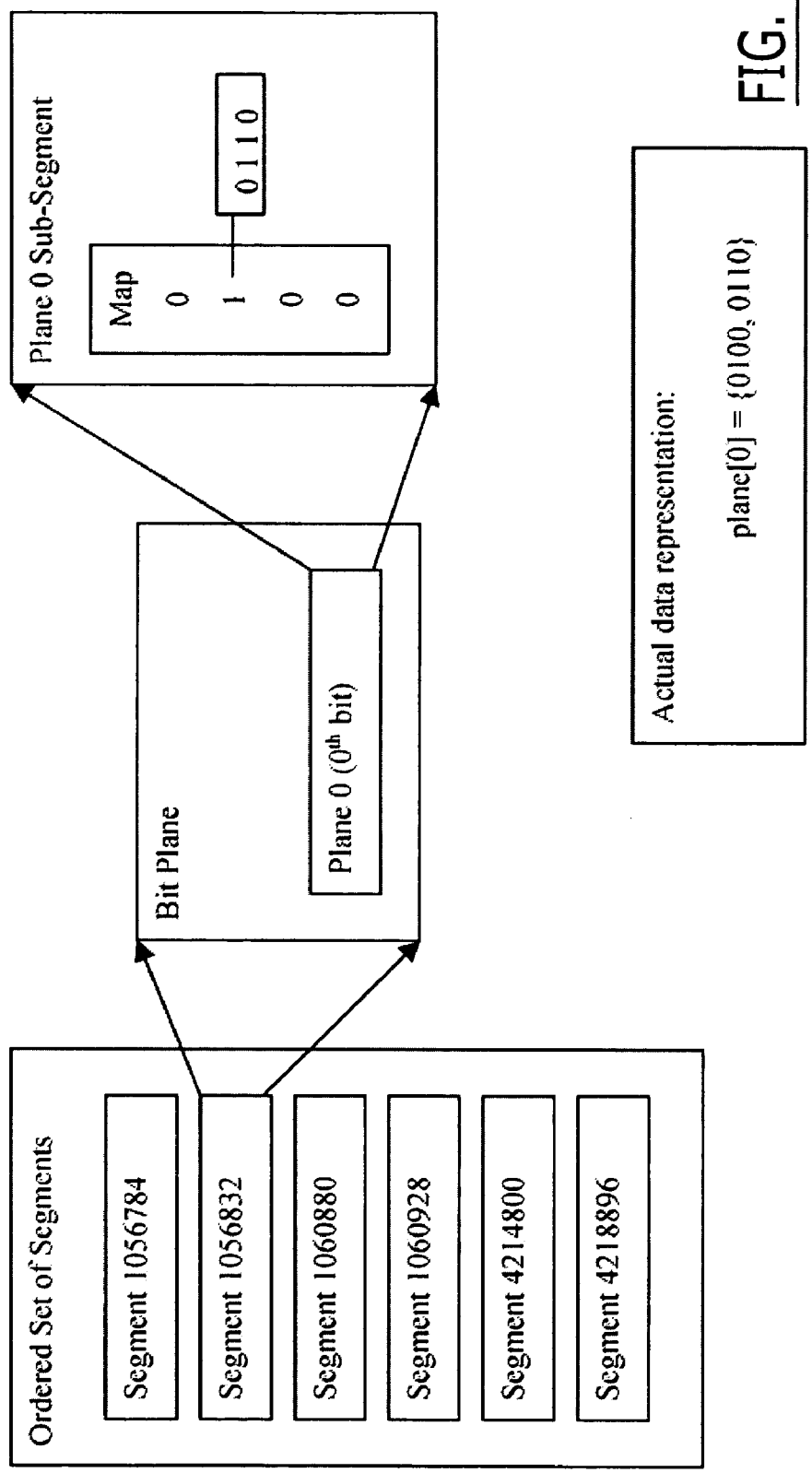

FIG. 15 illustrates another example planar structure for segment 1,056,832 of FIG. 13. In this example, only the 0 bit plane has data and the data is found in the second sub-segment of the bit plane representation, so that the map is 0100 and the data is 0110. The actual data representation is also shown.

Figure 16:
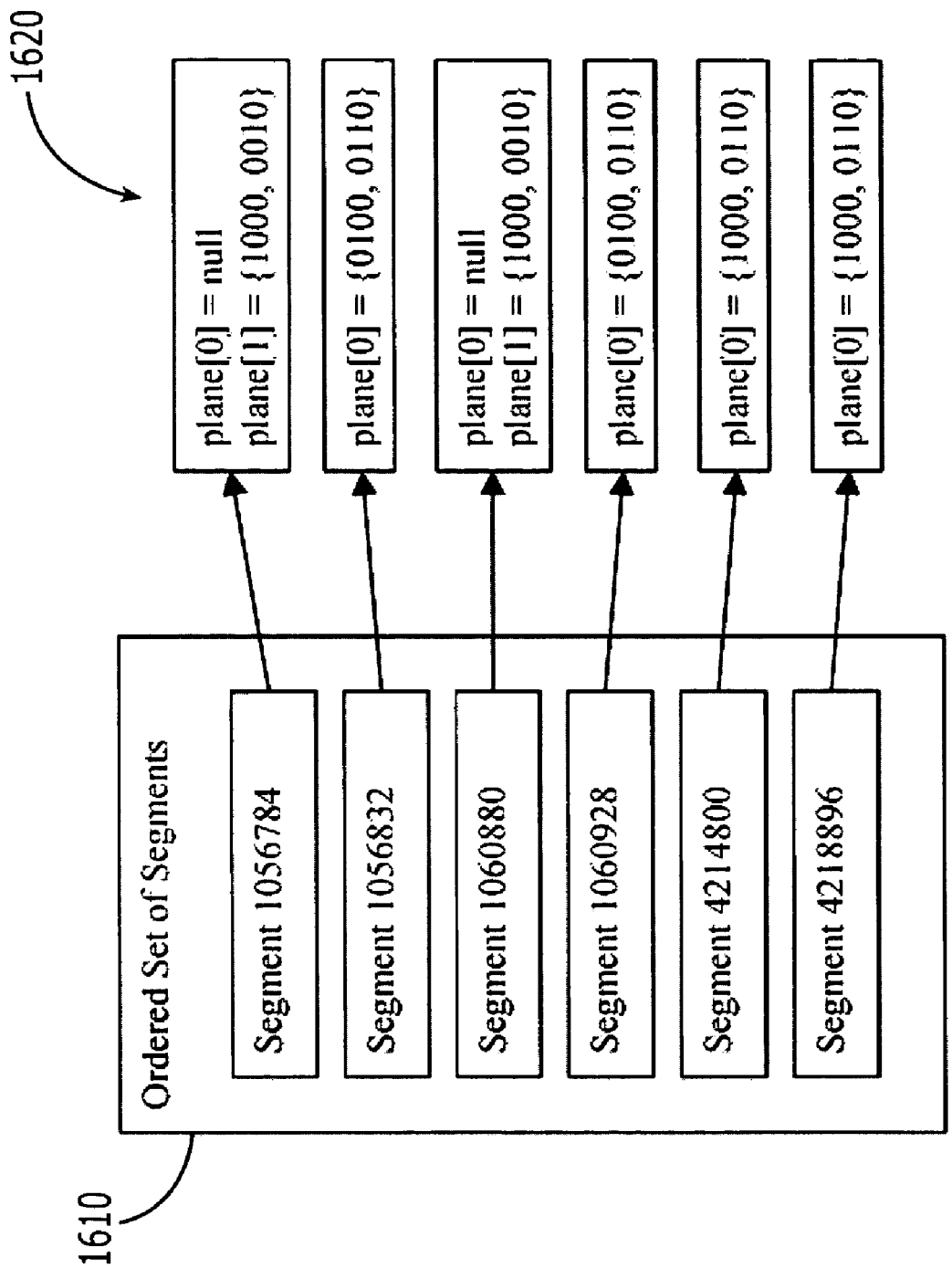

FIG. 16 illustrates the complete planar segment structure for the example of FIG. 13. Thus, as shown in FIG. 16, at Block 1610, selected identifications of those segments that have at least one count that is associated therewith are stored. Moreover, at Blocks 1620, the at least one count that is associated with a respective identified segment is stored as at least one bit plane representation, wherein the bit plane representation identifies a value of the at least one associated count for a bit position of the count that corresponds to the associated bit plane. As also shown in FIG. 16, in some embodiments, the bit plane representation is provided by a map of a position of the non-zero bit plane data in the at least one bit plane that has non-zero bit plane data associated therewith, and at least one representation of the non-zero bit plane that that is associated with the at least one bit plane that was identified.

Figure 17:
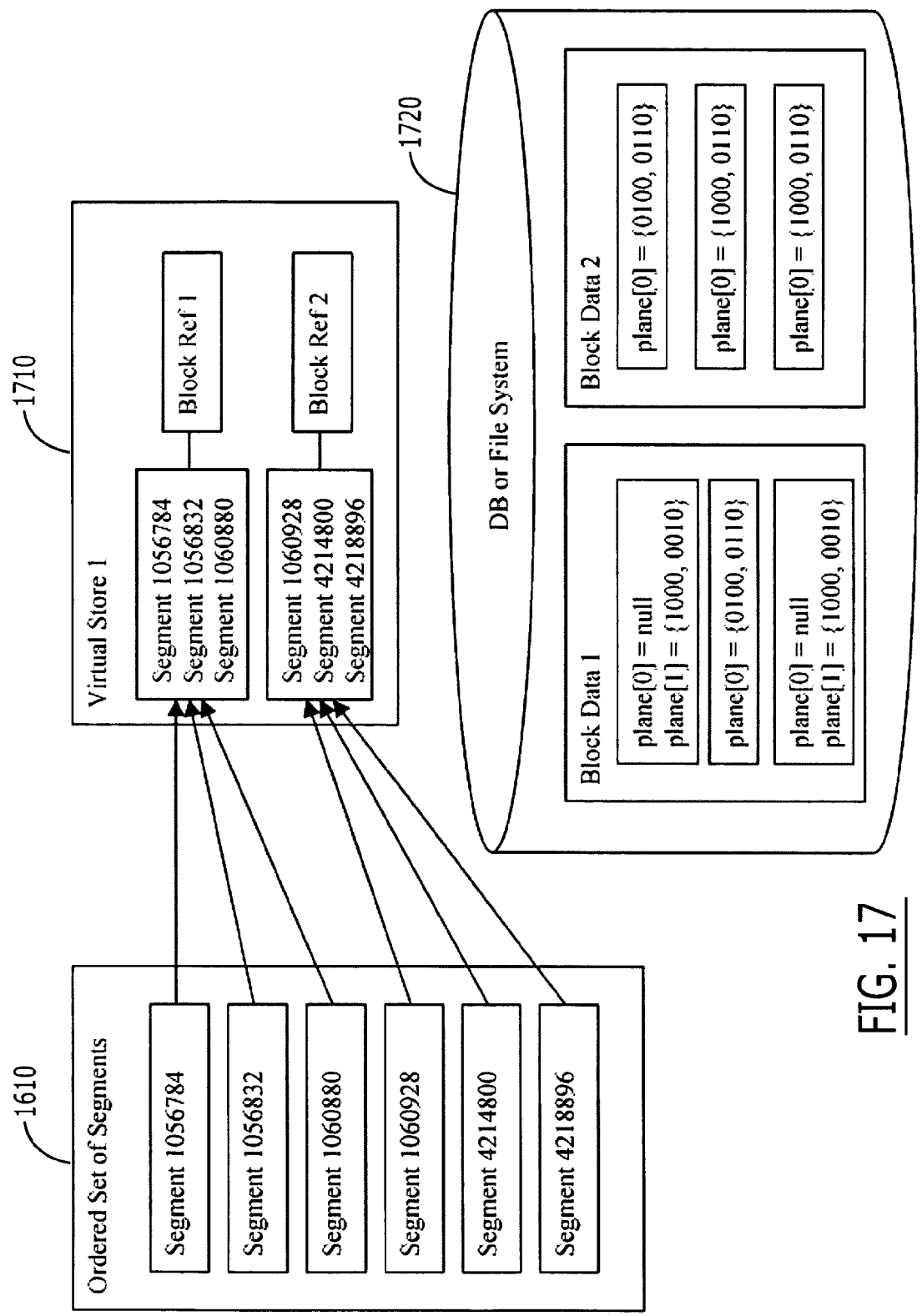

FIG. 17 illustrates how a planar segment structure according to exemplary embodiments of the present invention may be stored. As shown in FIG. 17, the ordered set of segments (Block 1610) may be stored in a virtual store 1710, denoted Virtual Store 1 in FIG. 17. The segments may contain references to the bit plane data that itself may be stored in a database or file system, as shown at Block 1720. The bit plane data may be stored as blocks of data. It will be understood, however, that many other storage techniques may be provided according to various embodiments of the present invention, using one or more hierarchical levels of storage devices.

FIG. 18 illustrates an example of generating a small association matrix according to other embodiments of the present invention. A small association matrix, like the large association matrix described above, stores the association counts for internal attributes. In the large association matrix, co-locality may be obtained by arranging category members together in the same row. In the small association matrix, more emphasis may be given to compressing the data into a small memory footprint, and less emphasis may be given to query (read) time. According to some embodiments of the present invention, the small association matrix may accomplish co-locality by reindexing or reorganizing the segments (such as the rows of the association matrix). In other embodiments, only half of the symmetric association matrix also may be stored. Accordingly, embodiments of FIG. 18 illustrate how the identifications of those segments that have at least one count that is associated therewith can be reorganized into a continuous range. FIG. 18 uses the previous example of the context of (Person:John, Person:Mary, City:New York) and (Person: John, Person:Mary, City:Seattle). In the example of FIG. 18, the internal attributes are defined as 16 bit numbers. FIG. 18 illustrates generation of the internal attributes before reorganizing, so that, at this point, FIG. 18 is similar to Block 630 of FIG. 6.

Referring now to FIG. 19, the segments (here, rows) are reorganized to only track rows and columns that contain data. This may be provided by an intermediate step, shown in FIG. 19, that maps the internal attributes 1910 to a new row/column index shown at Block 1920. Also, since the matrix is symmetric, only the bottom half of the matrix may be tracked. Thus, as shown in FIG. 19, the internal attributes 258, 259, 1029, 1030 are mapped into a small matrix having internal attributes of 0, 1, 2 and 3. Operations of FIG. 19 may correspond to Blocks 410 and/or 412 of FIG. 3.

Figure 21:
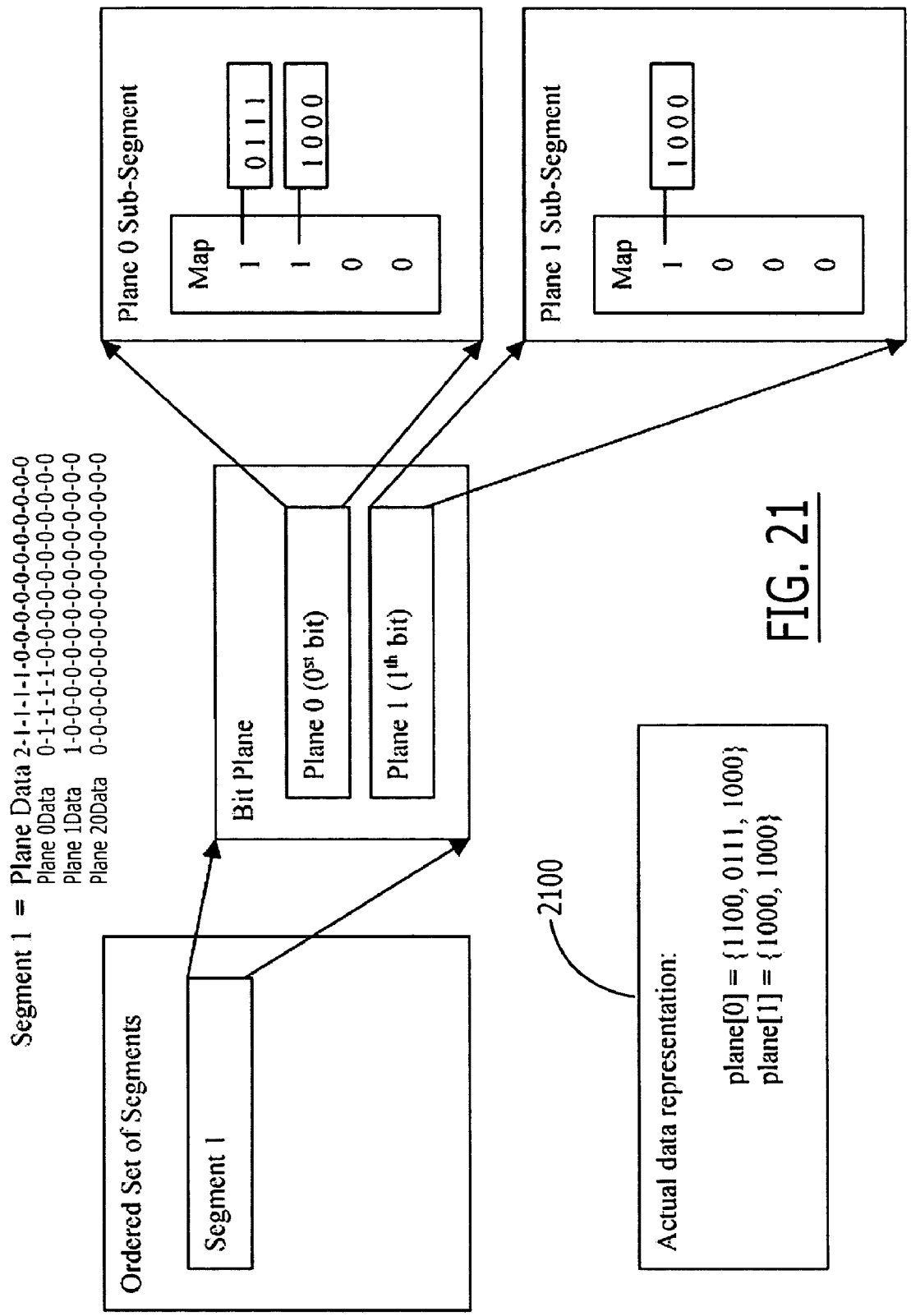

Then, as shown in FIG. 20, the small association matrix is partitioned into segments. In FIG. 20, the small association matrix of Block 1920 is written as a stream of data. The data is segmented into segments of 16 counts, where the number of map bits are 4 and the number of plane data bits are 4. Thus, in the example of FIG. 20, the data of the small association matrix is broken up into one segment of 16 counts. Then, as shown in FIG. 21, the small association matrix is stored as a planar segment structure using the same mechanism as the large association matrix, which may correspond to Blocks 430 and/or 132 of FIG. 3. Thus, as shown in FIG. 21, only plane 0 and plane 1 have actual count values, and the plane 0 sub-segment and the plane 1 sub-segment are stored using a map and a representation similar to that of the large matrix, as was described above. An actual data representation is shown at Block 2100.

FIGS. 22-32 are flowcharts which describe detailed operations according to exemplary embodiments of the present invention. These flowcharts will be used to provide a detailed explanation of converting an external context to an internal representation, to illustrate how observing can be performed and to illustrate how imagining can be performed, according to exemplary embodiments of the invention.

Figure 22:
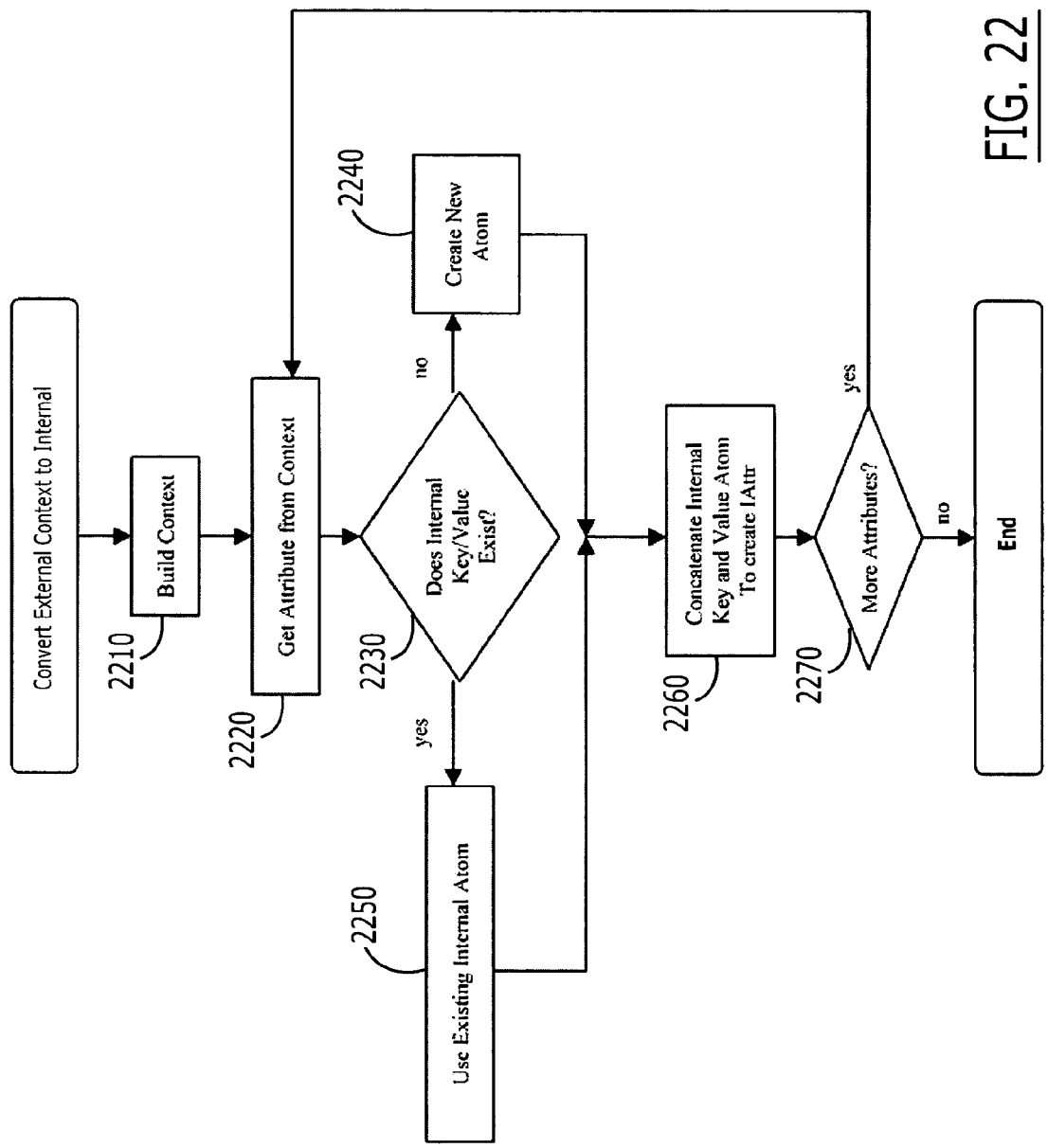
FIGS. 22-32 are flowcharts of detailed operations that may be performed according to exemplary embodiments of the present invention.

FIG. 22 is a flowchart of operations that may be used to convert an external context to an internal context, as was generally described, for example, in FIG. 6. In general, to observe a new association, the association among the observed attributes is added to the at least one bit plane representation that corresponds to the observed attributes, if the observed attributes exist in the identification of segments of the association matrix that have at least one count that is associated therewith. Moreover, at least one bit representation for the observed attributes is created, if the observed attributes do not exist in the identification of segments of the association matrix that have at least one count that is associated therewith.

In particular, as shown in FIG. 22, operations begin at Block 2210 to build a context. At Block 2220, the attributes are obtained from the context, for example as was shown at Block 610 of FIG. 6. A test is made at Block 2230 as to whether the internal key/value already exists. If not, at Block 2240, a new atom (i.e., an entry in the atom table at Block 620 of FIG. 6) is created. Alternatively, if the internal key/value already exists at Block 2230, then the existing internal atom is used at Block 2250. At Block 2260, the internal key and value are concatenated to create an internal attribute, for example as was shown at Block 630 of FIG. 6. If there are more attributes at Block 2270, then operations continue. If not, operations end.

Figure 23:
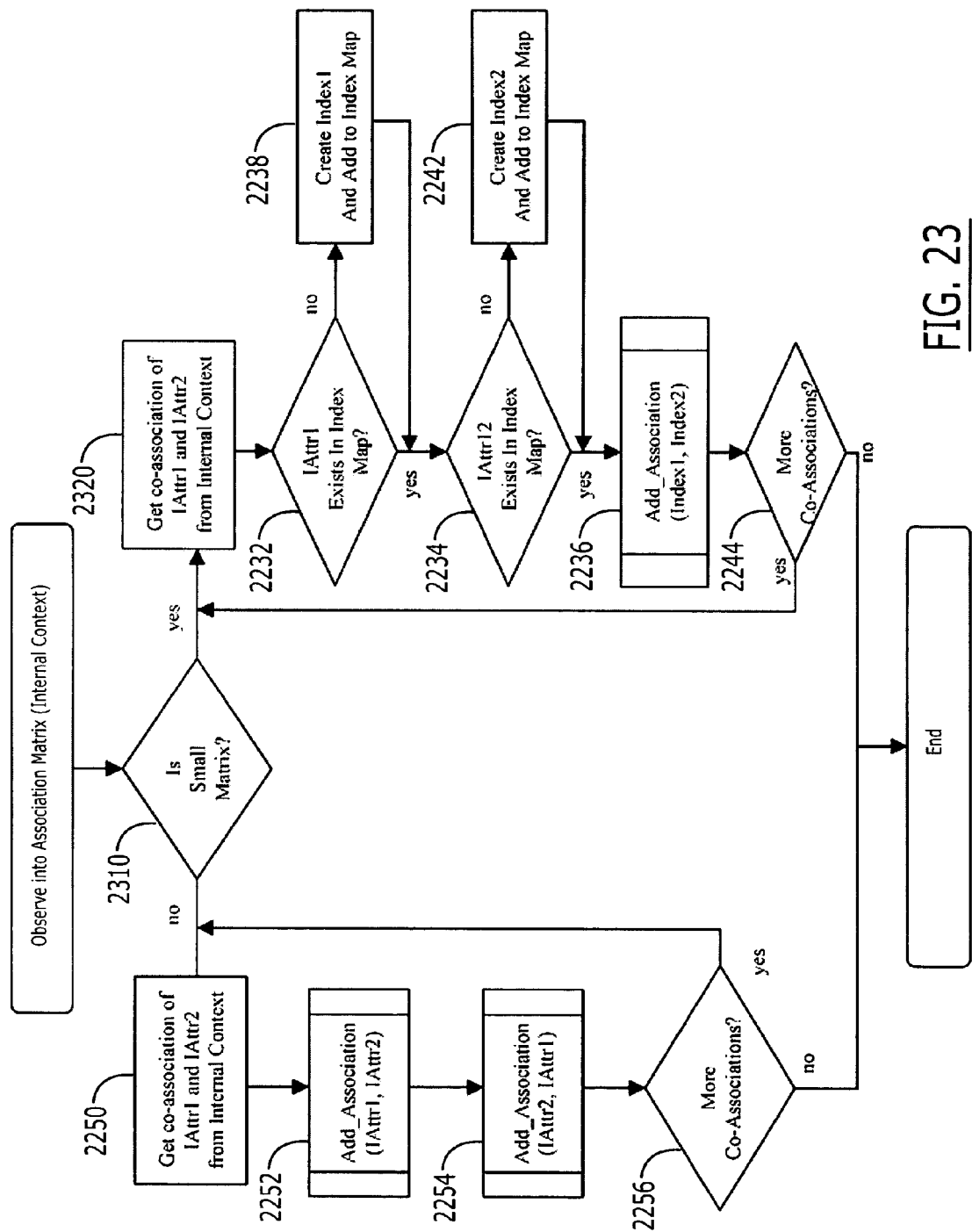

FIG. 23 is a flowchart of operations that may be performed to observe an internal attribute into the association matrix. A test is first made at Block 2310 as to whether a small matrix is present. If yes, then at Block 2320, the co-association of the first and second internal attributes is obtained. At Blocks 2232 and 2234, if the internal attributes both exist, then the associations are added at Block 2236. Note that they may be added to the association matrix only once, since only the lower half of the matrix data may be stored. If they do not exist, then they are created at Blocks 2238 and 2242. Finally, if there are more co-associations at Block 2244, then operations continue. Returning to Block 2210, if a large matrix is present, then at Block 2250, the co-association of the two attributes is obtained from the internal context and the new associations are added at Blocks 2252 and 2254. Note that the new associations are added twice because both halves of the large matrix are stored. If there are more co-associations, operations continue at Block 2256.

Figure 24:
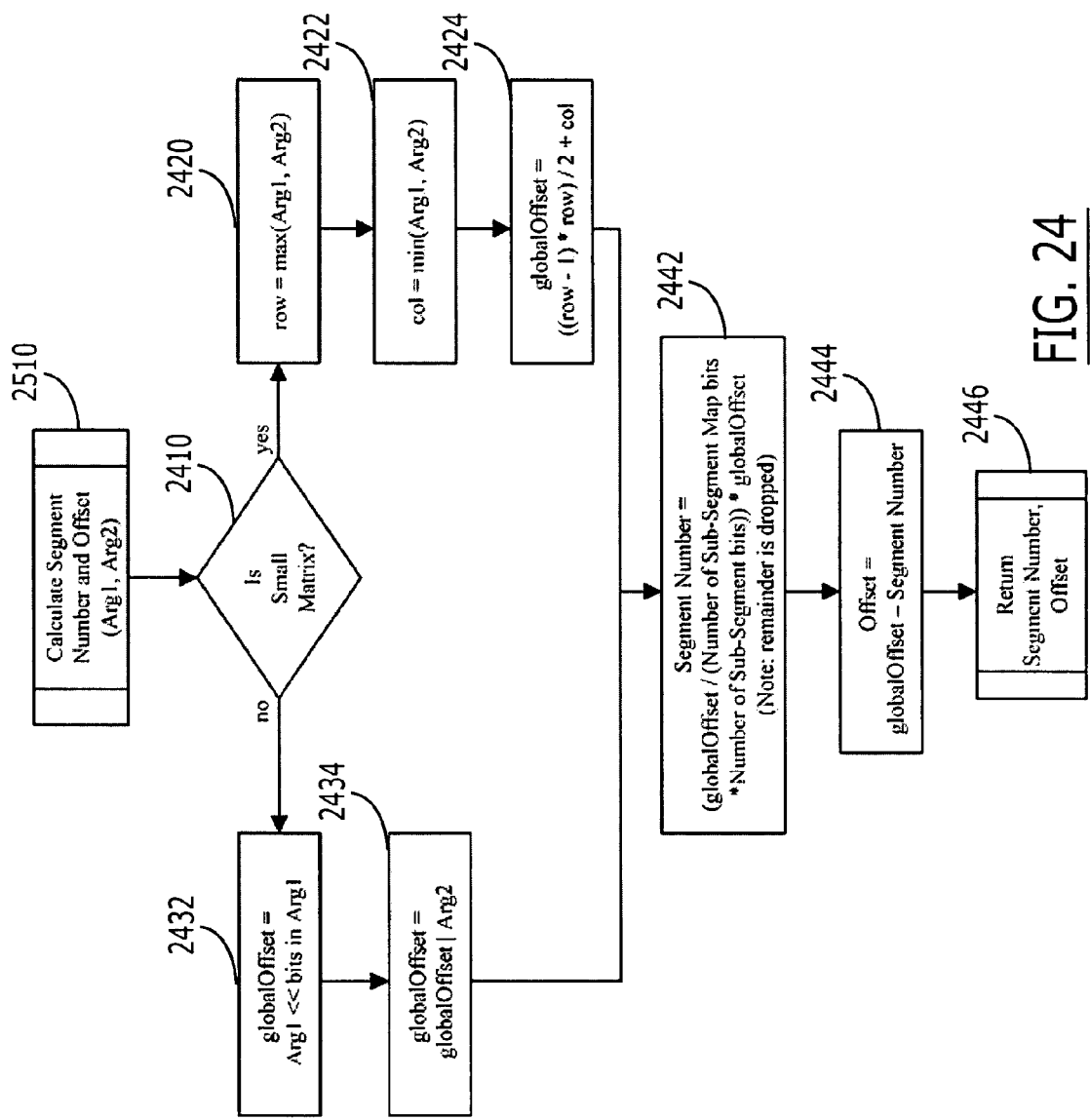

FIG. 24 is a flowchart of operations that may be used to calculate a segment number and an offset for two arguments, Argument 1, Argument 2. These operations will be used in subsequent flowcharts, as will be described below.

Referring to FIG. 24, a first test is made at Block 2410 as to whether a small matrix is present. If yes, then at Block 2420, the row is set, and at Block 2422, the column is set. Finally, at Block 2424, the global offset is set. Alternatively, if the large matrix is present, then the global offset is set at Block 2432 and at Block 2434. Then, at Block 2442, the segment number is set and at Block 2444, the offset is set. The segment number and offset are then returned at Block 2446.

Figure 25:
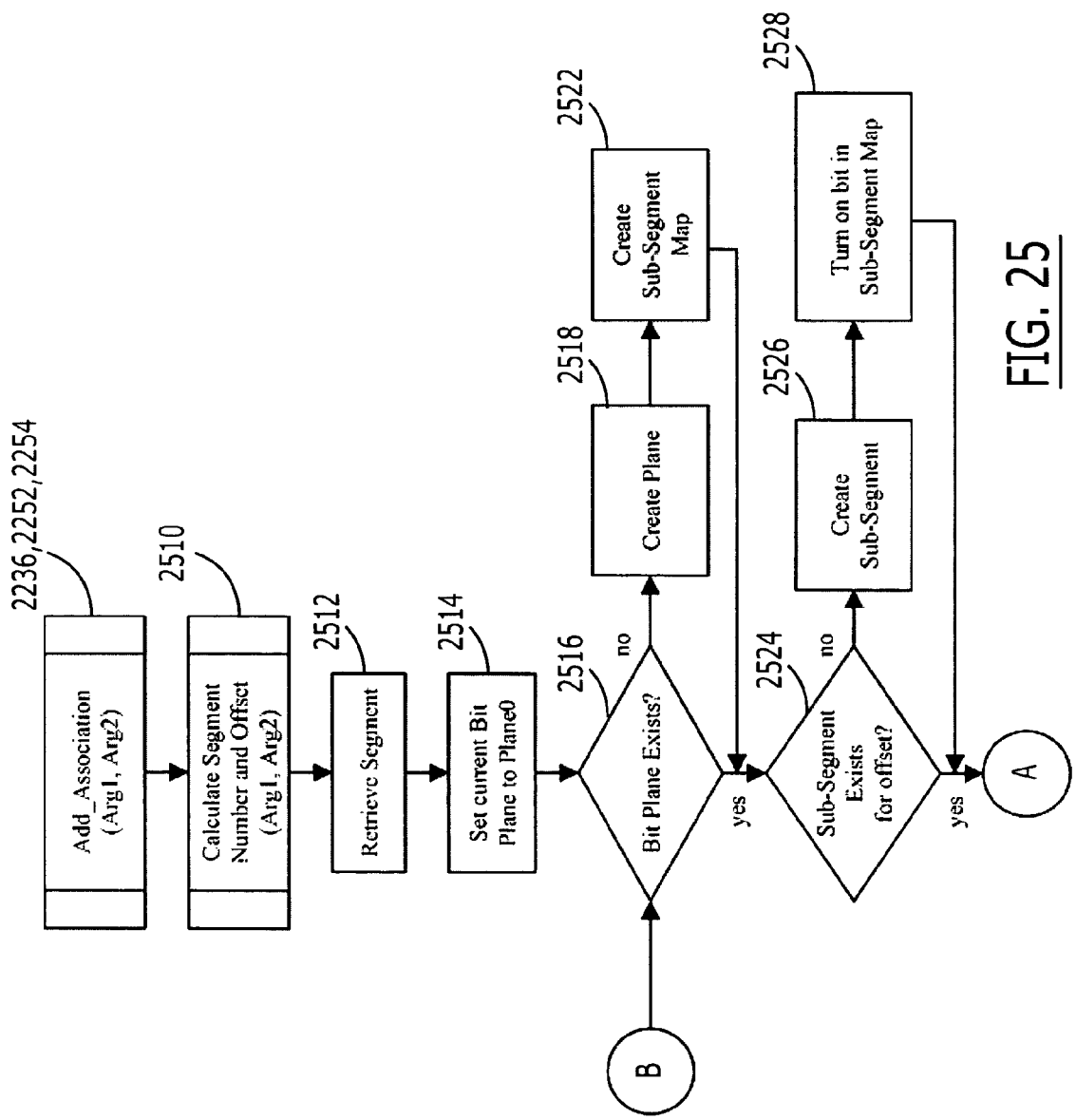

FIG. 25 is a flowchart of operations that may be performed to add an association which may correspond to Blocks 2236, 2252 and 2254 of FIG. 23. For generalization, the generic terms Arg1, Arg2 are used.

Referring to FIG. 25, a segment number and offset are calculated at Block 2510 as was already described in connection with FIG. 24. The segment number that was returned at Block 2446 is retrieved at Block 2512, and the current bit plane is set to Plane0 at Block 2514. If the bit plane does not exist at Block 2516, then the bit plane is created at Block 2518 and a map is created at Block 2522. On the other hand, if the bit plane exists at Block 2512 but the sub-segment does not exist for that offset at Block 2524, then the sub-segment is created at Block 2526, and that bit in the map is turned on at Block 2528.

Figure 26:
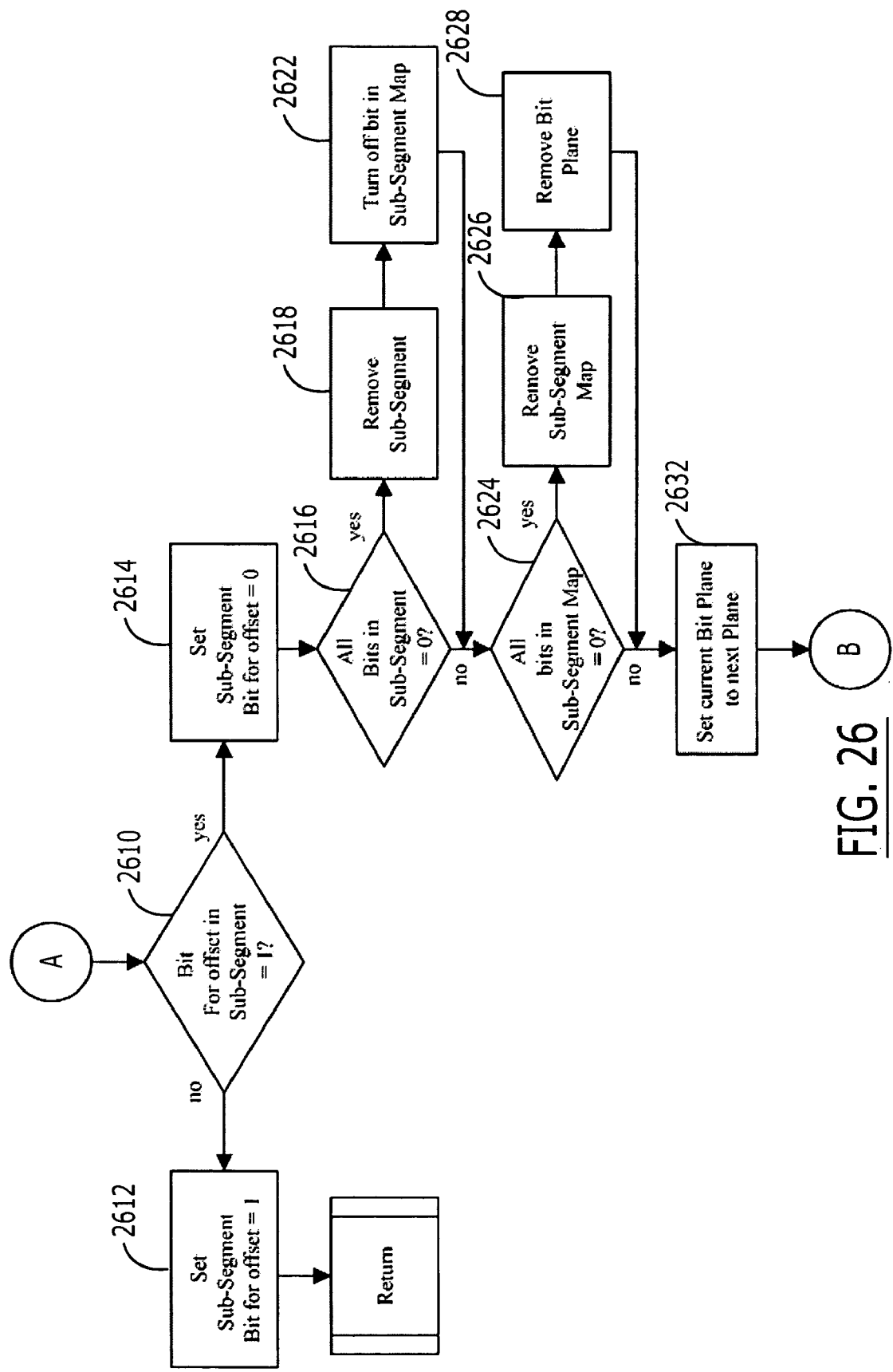

Operations then continue at FIG. 26. In FIG. 26, a determination is made as to whether the bit for the offset is in the first sub-segment, at Block 2610. If no, then the sub-segment for the bit is set at 1 at Block 2612. Alternatively, if yes, then the sub-segment bit for the offset is set to 0 at Block 2614. A test is then made at Block 2616 as to whether all the bits are in the sub-segment are 0. If yes, then that sub-segment is removed at Block 2618 and the bit in the sub-segment map is turned off at Block 2622. On the other hand, if all the bits in the sub-segment are not 0 at Block 2616, then a test is made at Block 2624 as to whether all bits in the sub-segment map are 0. If yes, the sub-segment map is removed at Block 2626, and the bit plane is removed at Block 2628. The current bit plane is then set to the next bit plane at Block 2632 and operations return to Block 2516 of FIG. 25. Accordingly, operations of FIG. 26 may account for "carries" of bit plane data across bit planes.

Figure 27:
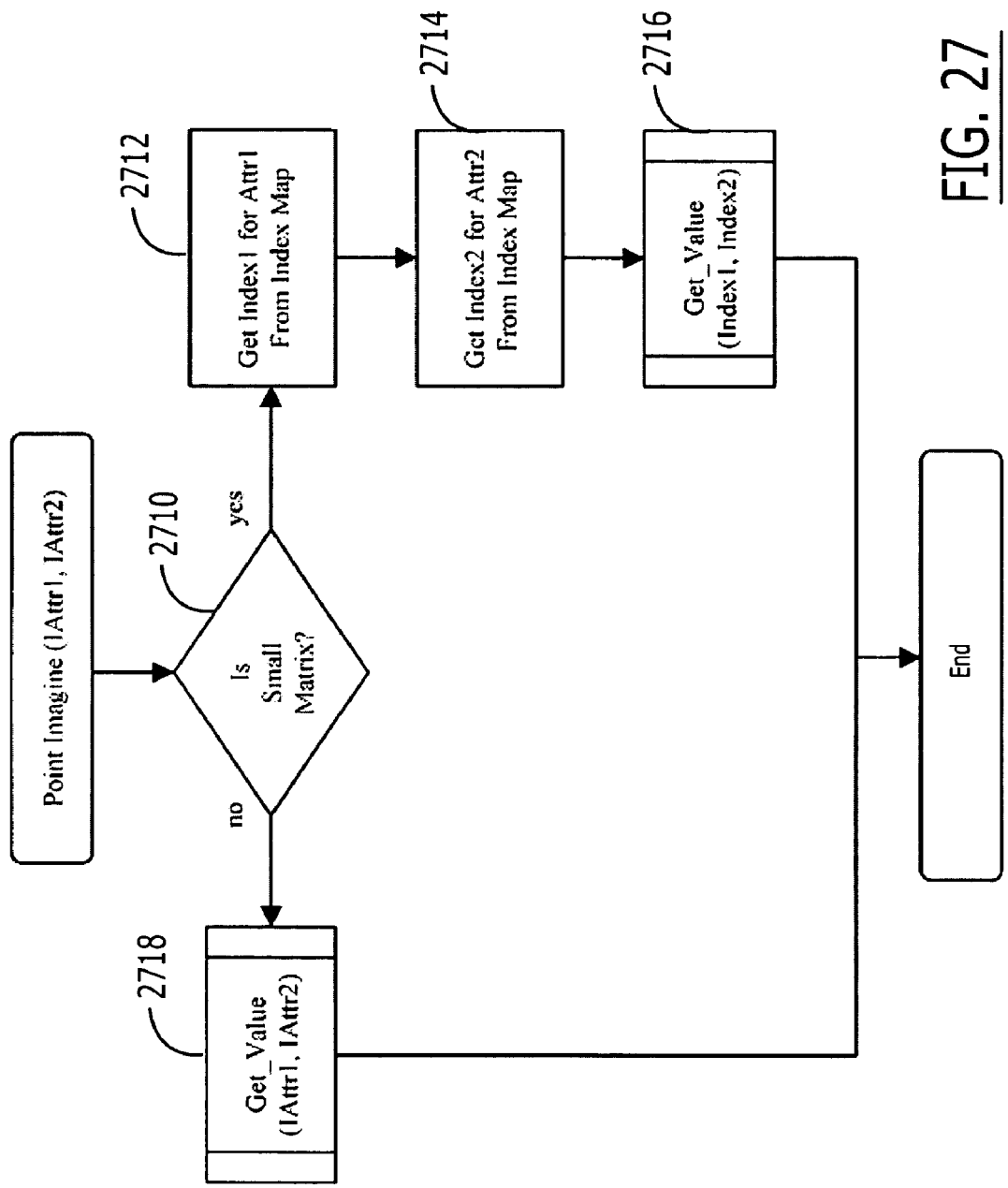

FIG. 27 is a flowchart of overall operations for imagining according to embodiments of the present invention. In general, imagining may be performed by obtaining the at least one bit plane representation that corresponds to the selected attributes in the compressed association matrix, and by converting the at least one bit plane representation that was obtained to a count that identifies associations among the selected attributes.

In some embodiments, two types of imagining may be performed: a point imagine and a scan imagine. In a point imagine operation, a count that is associated with two attributes is obtained. In a scan imagine operation, counts across a larger set of attribute pairs are obtained.

Referring now to FIG. 27, operations to perform a point imagine now will be described. At Block 2710, a determination is made as to whether a small matrix is present. If the small matrix is present, then the index for the first attribute is obtained at Block 2712 and the index for the second attribute is obtained at Block 2714. The appropriate value is then obtained at Block 2716, as will be described in detail below in connection with FIG. 28. On the other hand, if a large matrix is present at Block 2710, then the value is also obtained at Block 2718, as will be described below in connection with FIG. 28.

Figure 28:
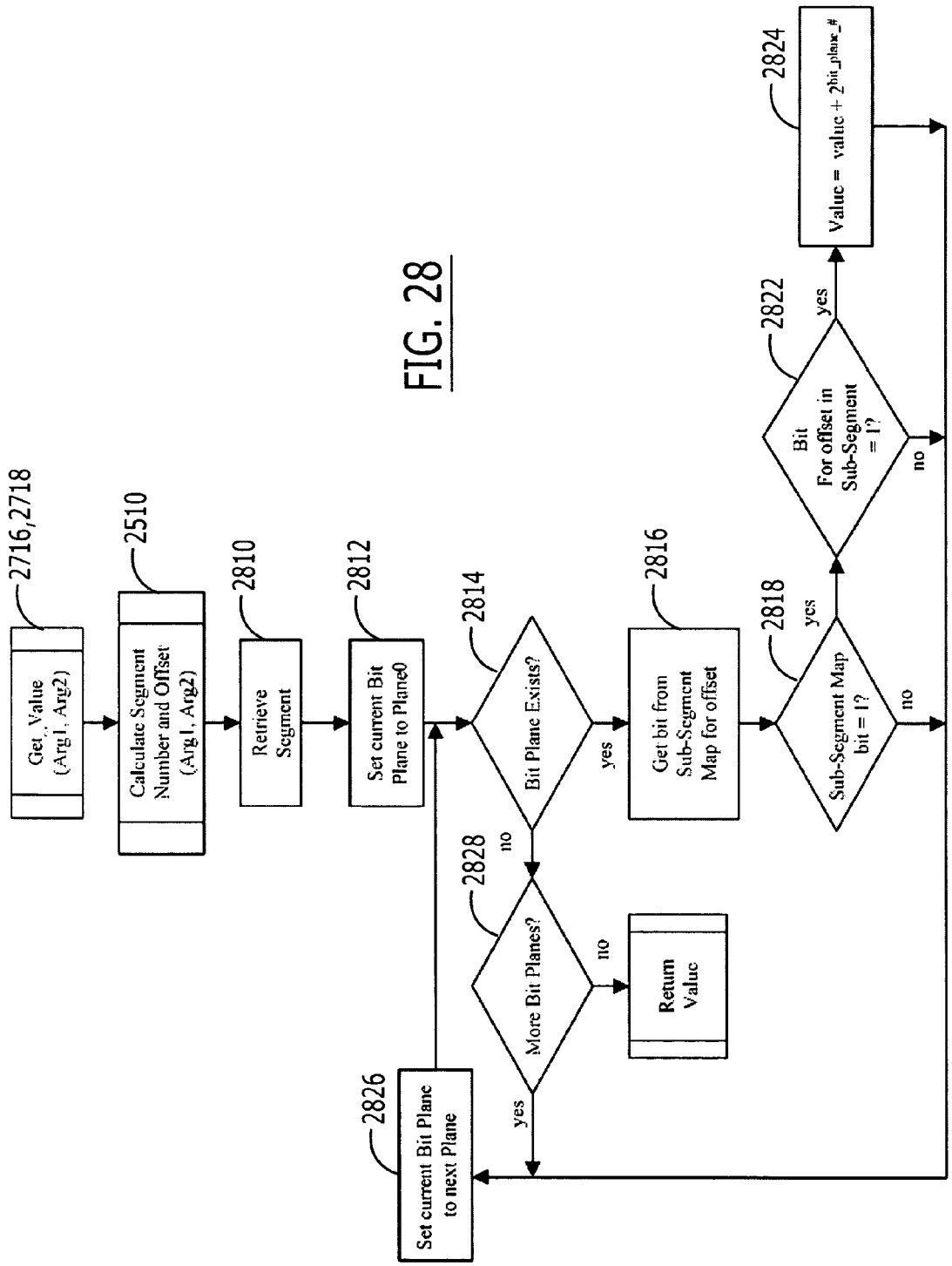

FIG. 28 is a flowchart of operations that may be performed to obtain the value in the indices or attributes, which may correspond to Blocks 2716 or 2718 of FIG. 27. For generalization, the term "Argument"(Arg) is used for indices and/or attributes. As shown in FIG. 28, the segment number and offset are calculated, as was performed at Block 2510. The segment is retrieved at Block 2810 and the current bit plane is set to Plane0 at Block 2812. If the bit plane exists at Block 2814, then the bit is obtained from the sub-segment map for the offset map at Block 2816. If the sub-segment bit is 1 at Block 2818 and the bit for the offset in the sub-segment is equal to 1 in Block 2822, then the value is set at Block 2824 as the current value+$2^{bit\_plane\_\#}$. Otherwise, the current bit plane is set to the next bit plane at Block 2826, and operations at Block 2814 continue until a bit plane does not exist at Block 2828. The value is then returned.

Figure 29:
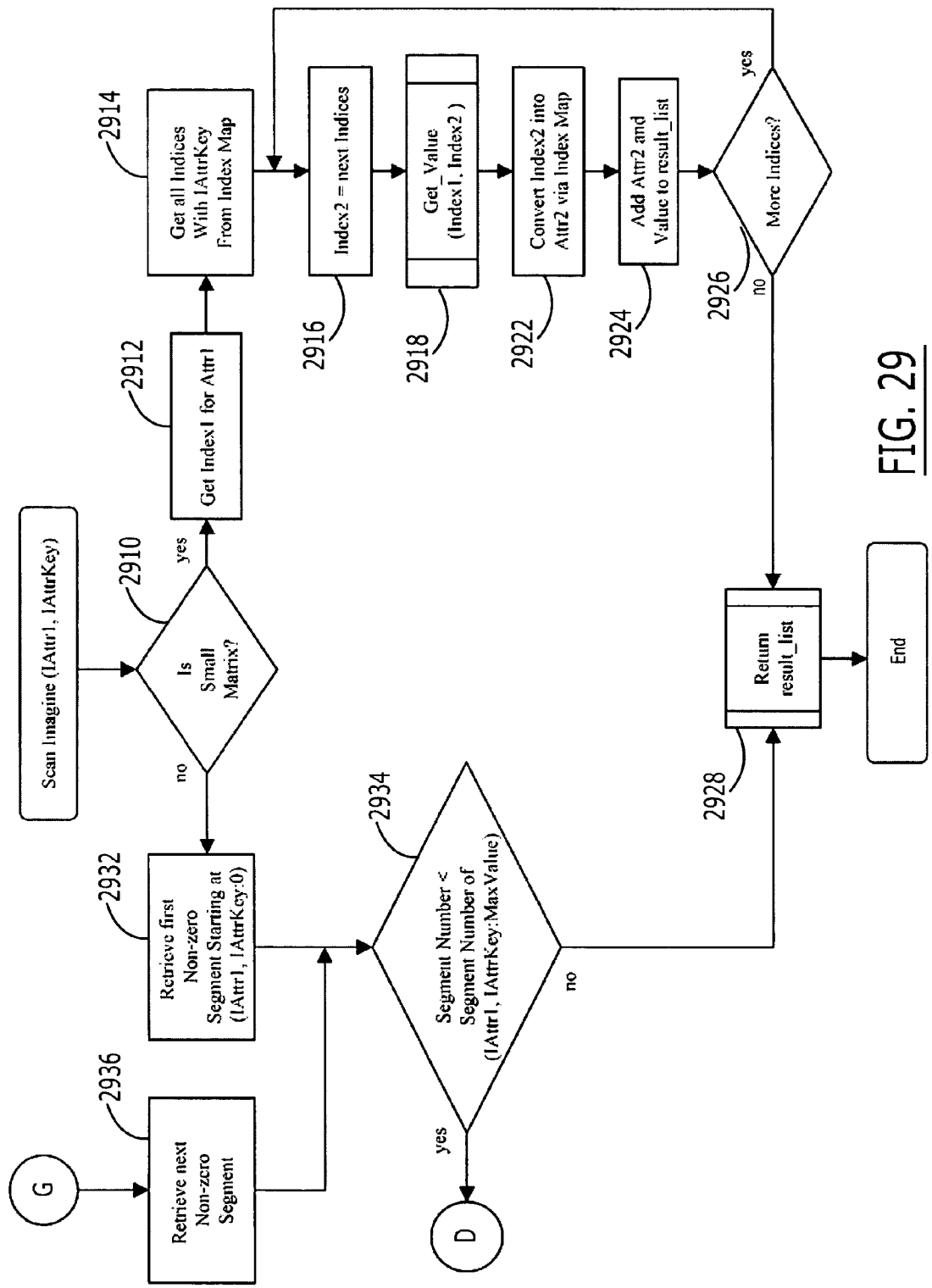

FIG. 29 is a flowchart of operations that may be performed to perform a scan imagine, i.e., an imagine that provides a series of key:value:count results. For example, counts for a row of an association matrix may be returned. At Block 2910, a test is made as to whether a small matrix is present. If the small matrix is present, then the index is obtained for Attr1 at Block 2912, and all indices with that attribute key are obtained from the index map at Block 2914. The next index is set to Index2 at Block 2916, and the value is obtained, as was already described in connection with FIG. 28. Then, at Block 2922, the Index2 is converted into an Attr2 via the index map, and the Attr2 and value are added to the results list at Block 2924. These operations continue at Block 2926 until there are no more indices, after which, at Block 2928, the result list is returned.

Referring again to FIG. 29, if the large matrix is present at Block 2910, then at Block 2932, the first non-zero segment is retrieved, and a test is made at Block 2934 as to whether the segment number is less than the segment number of the key with the maximum value. If yes, then operations continue at FIG. 30. Accordingly, Blocks 2932 and 2934 provide basic start/stop control for the scan imagine operation.

Figure 30:
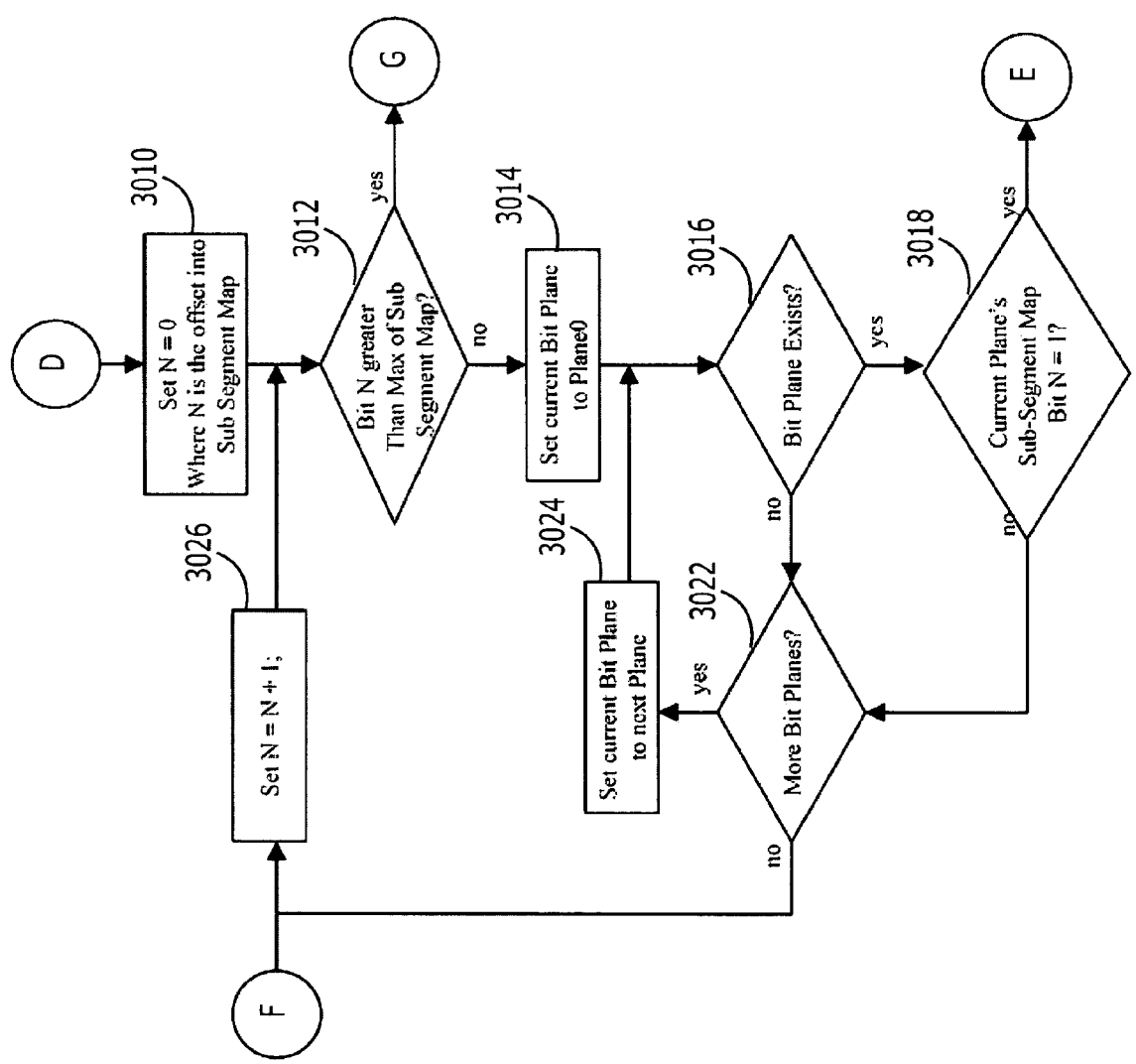

As shown in FIG. 30 at Block 3010, N is set to 0, where N is the offset into the sub-segment map. A test is then made at Block 3012 as to whether bit N is greater than the maximum of the sub-segment map. If yes, then operations return to Block 2936 of FIG. 29. If no, the current bit plane is set to Plane0 at Block 3014, and if the bit plane exists at Block 3016 and the current plane sub-segment map bit is 1 at Block 3018, then operations continue to FIG. 31. If not, and more bit planes are present at Block 3022, then the current bit plane is set to the next bit plane at Block 3024, and operations continue. If there are no more bit planes at Block 3022, then N is set to N+1 at Block 3026 and operations continue.

Figure 31:
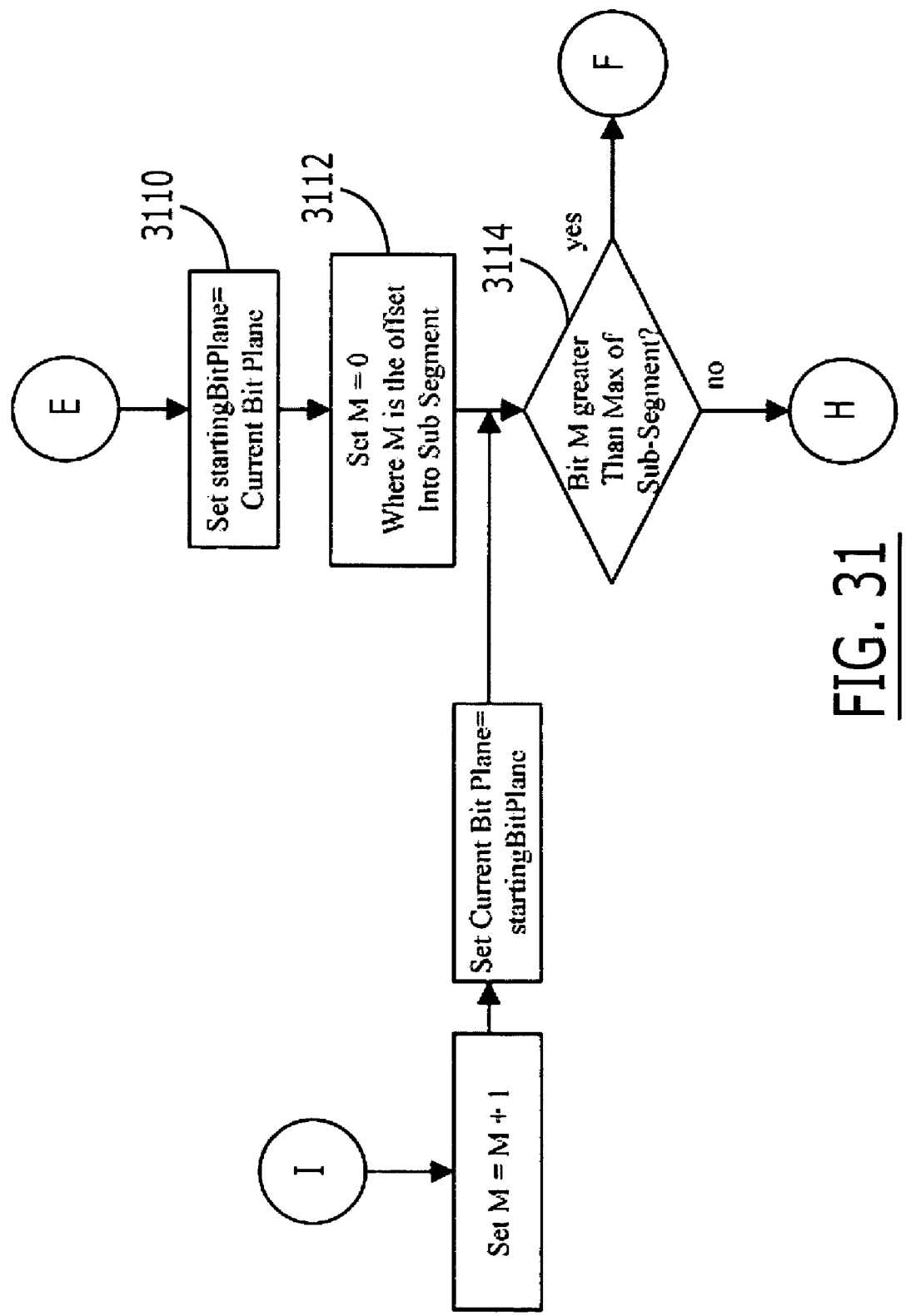

Referring now to FIG. 31, the starting bit plane is set to the current bit plane at Block 3110 and M is set to 0, where M is the offset into the sub-segment of Block 3112. A test is made at Block 3114 as to whether M is greater than the maximum of the sub-segment. If yes, then operations continue via F to Block 2026 of FIG. 30. If no, then operations continue at H to FIG. 32.

Figure 32:
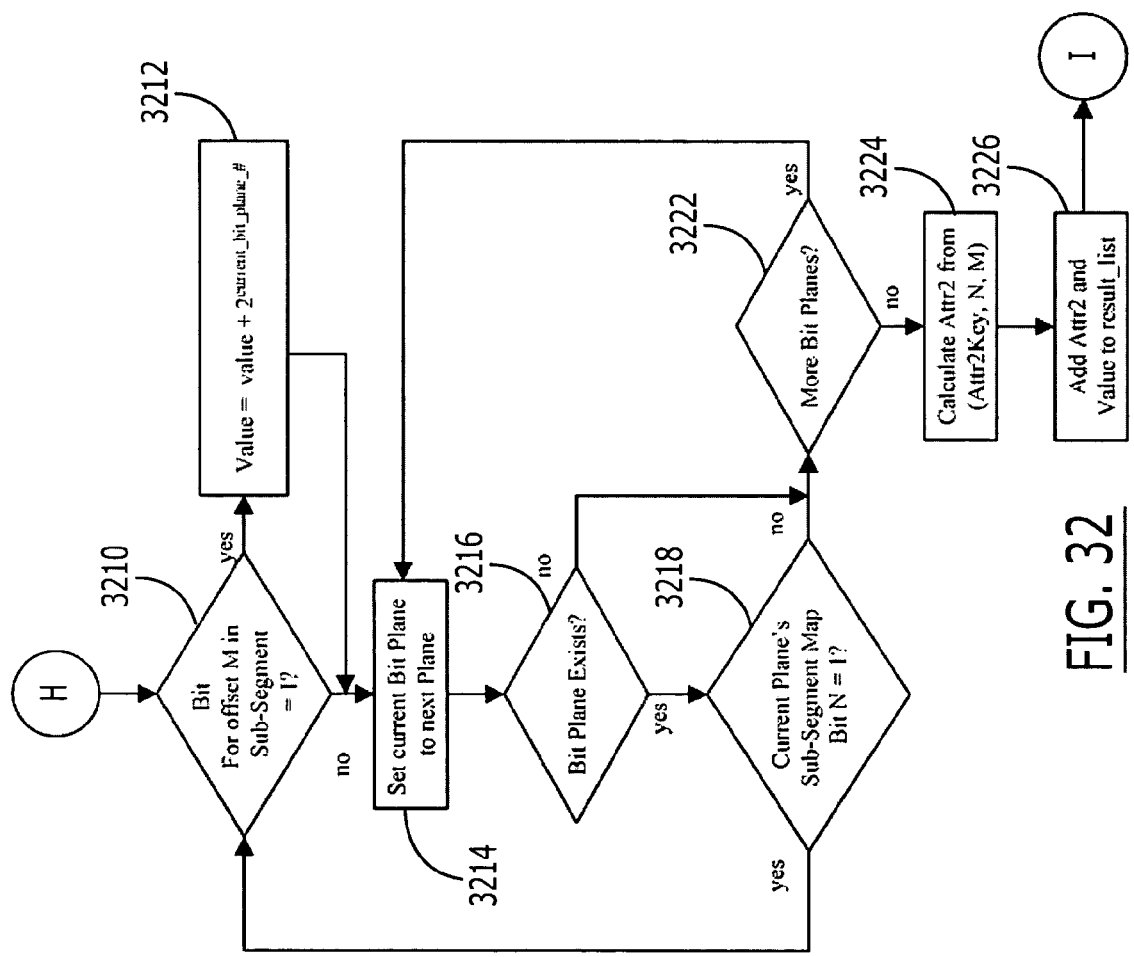

Referring now to FIG. 32, a test is made at Block 3210 as to whether bit for offset M is in the first sub-segment, and if yes, the value is set at Block 3212. Thus, Block 3212 can build a number for every value. If no, then the current bit plane is set to the next plane at Block 3214, and a test is made at Block

3216 as to whether the bit plane exists. If yes, then at Block 3218, if the current plane sub-segment is equal to 1, operations return to Block 3210. Otherwise, a test is made at Block 3222 as to whether there are more bit planes, and if not, Attr2 is calculated at Block 2224 and Attr2 the value is added to the results list at Block 3226.

Additional discussion of various exemplary embodiments of the present invention now will be provided. In order to provide a lossless memory, memory-based architectures according to embodiments of the invention may shift from philosophies of abstraction to philosophies of compression. Traditional artificial intelligence has often bemoaned the "curse of dimensionality" in the complexity of intelligent functions, whether logical or statistical. As such, rule-based heuristics and statistical techniques generally are lossy, model-based abstractions. Abstractions may lose information and accuracy. For example, rules may have problems in also covering exceptions to the rules, and market segmentations may be very inaccurate in their predictions about each individual customer. In contrast, association memories may seek to be perfect memories in the recording of experience, but such association memories do not scale well.

Embodiments of the invention can make the memories smaller. Smaller memories take less space and hold more information before resorting to abstraction and reduction. Embodiments of the invention can provide lossless compressions. Some embodiments of the invention may be contrasted with conventional compression methods that may be used in imaging, but may not serve well for an association memory. General compression, even if lossless, also generally may not be well suited for an association memory. For example, embedding compressions like arithmetic coding generally do not provide a searchable compression. Moreover, more than merely being searchable, association memories generally should allow random access. The problem may be analogized to the compression of very large data cubes, which generally is notoriously difficult. Moreover, for incremental learning, the compression should allow for new data updates, which data cube compressions, even if randomly accessible, may not provide. In summary, association memory compressions should allow lossless compression, random access, and incremental writing.

Embodiments of the invention can transform the situation of the external world into "snapshots" defined as attribute:value, or key:value, vectors. For example, a transaction record is defined as a vector of field-name and field-value. For unstructured sources, embodiments of the invention can use entity extractors to define the people, places, and things in each sentence, for example. These "entities" along with surrounding keywords describe the context: how each entity is associated with surrounding entities and keywords. As a cognitive construct, each entity may be modeled as a separate associative memory, but, in some embodiments, the attribute-values of a record or sentence may be treated as one context to be observed into one matrix. Entity associative memories are described in detail in application Ser. No. 10/980,520, filed Nov. 3, 2004, entitled *Network Of Networks Of Associative Memory Networks For Knowledge Management*, assigned to the assignee of the present invention, the disclosure of which is hereby incorporated herein by reference in its entirety as if set forth fully herein.

As more contexts are observed, the list of associations grows. As given associations are observed over and over again, the association count also grows, as was described above in connection with FIGS. 4-5B. Another way to view the list of associations would be in matrix form, where the key:value pairs are indices of the matrix. This matrix is called an association matrix, also known as a coincidence matrix, as was described above in connection with FIGS. 7-8. The dimension of the association matrix may grow at a $O(N^2)$ rate, where N is the number of key:value pairs. The counts themselves may grow at an $O(\log O)$ rate, where O is the number of observations. Embodiments of the invention can reduce or minimize the $N^2$ growth and can capitalize on the $\log O$ growth.

The external key:value information is changed into an internal representation. This allows for easier manipulation of the data. Every value for each "key" and "value" can be mapped to a numerical number (also called an "atom"), as was described in connection with FIG. 6. The "key" atoms and the "value" atoms are concatenated to produce an internal representation of the key:value pair: The concatenation of the key:value pair is represented via a single M bit numerical value (also called an internal attribute), where the first M/2 bits of the internal attribute is the key atom and the second M/2 bits is the value atom. Note that this example tracked the key atoms and value atoms in the same map. If the key and value atoms are tracked in separate maps the splitting of the M bit internal attribute could give more or less bits to the value atoms.

Real world implementations of the M bit internal attribute may set M to 64 (32 bits for key atom and 32 bits for value atom). This scheme, while simple, can provide a property for later efficiency: All the values can be low bit variations within the scope of the high bit keys. Therefore, all the internal attributes for values within a key can be co-located within the internal attribute distance. Depending on the type of association matrix used, this collocation property can aid in asking questions of the association matrix and having a run of all the possible answers be close to each other within a physical partition.

The internal attribute and the association counts are written to the association matrix. As was described above, there can be two types of association matrices where each may have their potential pros and cons. The large association matrix can be a $2^M \times 2^M$ matrix where the M bit internal attributes are the indices (FIGS. 7 and 8). Using the internal attribute as an index can allow for a natural ordering by keys as was described (e.g., all the people may be together). This order can be utilized in queries that request all associated attributes given an attribute and a key (e.g., all people associated with the city of New York). The large association matrix is typically a very large, sparsely filled matrix. Compression according to embodiments of the invention can concentrate on areas in the matrix with data while also ignoring areas without data. In some embodiments, such matrices can auto-associate ten thousand to ten million attributes, making them very sparse.

The large association matrix may have the following potential pros and cons:

Pros: First, key:values are directly mapped to the matrix indices. This can provide quick and direct computation of the index with no need to re-map the matrix indices through a translation table. Second, the key:value pairs can be naturally grouped together in linear sequence, which can allow for quick scanning of the matrix, such as when asking a question about a given key. Finally, the large matrix can be a full matrix; even though it is symmetrical, an association is stored twice as key:value1→key:value2 and key:value2→key:value1. While this generally is redundant information, this allows all given key:values to have their own "row" of contiguous key:value answers, which can be used as the matrix is linearized and segmented.

Cons: Large Matrices also may have large footprints. Even with segmentation and bit plane separation, the bits can be sparse and expensive to maintain. On the other hand, for such very large matrices, compression can be made as strong as possible but the focus can remain on collocation of bits to quickly answer queries within a given key—not just collocation for the sake of compression per se.

As a cognitive construct, large association matrices may play their best roles as large associative directories, for example. In embodiments that may be analogized to a router, such memories can look up key:values that may be the indices to other, smaller memories. Such large matrices may tend to also be few in number and may represent the big picture, while smaller memories may capture the details.

Each smaller matrix, also called a small association matrix, may also store the association counts between internal attributes. However, the small association matrix can give more emphasis to compressing per se into a small memory footprint and less emphasis to fast query (read) times when the space becomes very large as in large matrices.

The rows of the small association matrix can be reorganized to only track the row/columns of the matrix that contain data. As shown in FIG. 19, this can be accomplished by an intermediate step, a translation table 1910 that maps the internal attribute to a new continuous row/column index. The translation table 1910 also may be sorted to allow greater co-location. Also, since the association matrix is symmetric and the emphasis is on compression, only the bottom half of the matrix is tracked. Small matrices can be lower triangular.

The small association matrix also may have its potential pros and cons:

Pros: The footprint can be very small. Associative counts are much less sparse and only half of the full matrix needs to be represented. Given any two internal attributes, their associative count is contained at the greater's row and lesser's column.

Cons: The translation table potentially is an added cost for computation and storage. Also, attributes may now be arbitrarily located, so that more random accesses may be needed for disbursed associative counts, unlike the large matrix that can include co-located values for scanning.

On the other hand, small matrices may be more likely to be containable in RAM, which can allow efficient random access, while large matrices may tend to not fit in RAM. The I/O bottleneck may become dominant and so the co-location of attributes may become more desirable. In summary, these matrix types that are used may not be based on compression algorithms alone, or the size and operation of just one such matrix. More towards the scale of an entire brain, exemplary embodiments of the invention can build millions of such matrixes, and, in some embodiments, mostly small with some large, for large, enterprise scale applications. For such applications, I/O may be the dominant bottleneck and so these matrices may be designed toward two different strategies for two different roles: If very, very large, then collocate and partition to send only parts between cache and store. If small, then compress to send the whole matrix (but smaller) between cache and store.

Data from within either of the association matrix types may be viewed as a long list of counts. In some embodiments, the list of counts is partitioned into subsets of size L×K, where L is the number of map bits and K is the number of bits in the plane data. Realistic implementations may set L and K to be 64 bits, but for simplicity L and K may be set to 4 bits. Therefore, the linear representation of an association matrix may be partitioned into smaller segments of 16 counts. Segments that contain only counts of 0 are ignored. This segment structure may only track segments that contain non-zero data.

The small association matrix also may be written as a stream of data defined by a linearization of a lower triangular matrix. A number of shape-filling curves are possible to linearize and co-locate 2-D maps, for example. Matrices are also 2D maps of a sort, and the simple line-curve, row-by-row, through the lower triangular matrix may have the best space filling properties and query performance.

Each segment may be represented as a set of bit planes, according to exemplary embodiments of the present invention. Bit plane separation is known for compression, such as used within JPEG for images. For images, of 256 bits for example, each of the 256 "planes" in the power of 2 series accounts for every bit for all pixels that have the specified bit ON within the particular plane. This representation may be thought of as if all the pixel values were represented in binary and the entire image turned on its side. Each plane then represents all the bits at each level in the power series.

While bit planes may be used as part of image compression, it can be particularly valuable for associative matrix compression. In images, the bits can be found arbitrarily in any plane, completely dependent on the image and pixel encoding. In this sense, a bit at any plane is equally likely as any other bit at any other plane (in general). Association matrices, however, generally are used in machine learning systems. In this case, lower counts are more likely than higher counts in the sense that higher counts are produced only as the observation load increases. This demand generally is logarithmic in that twice as many observations may have to be seen beyond the current observations just to increase the number of planes by just one more plane. According to exemplary embodiments of the present invention, rather than allocate a fixed counter size, which is underutilized (or will overflow), bit planes are generated only on demand. Matrices with shallow loadings can use only a few bit planes, while more resource may be devoted to deeper matrices that have higher loadings. Thus, in some embodiments of the invention, bit planes can grow locally, as needed by a given segment, rather than growing the entire association matrix based on the needs of the largest count.

Moreover, while images are separated into bit planes, the linearization of associative matrices and the separation of segments according to exemplary embodiments of the invention can allow the demand-based growth of bit planes not to exceed the greatest count of each segment—rather than the entire matrix plane. Co-location in 2D images can lead to other compression methods such as Quad-trees or R-trees. However, key-value co-locality of associations generally is more linear and therefore may be organized into linear segments, according to exemplary embodiments of the present invention. In any case, the entire matrix can be viewed from the side in terms of its segments and bit planes; where counts are high the segment can use more bits, while other areas of the matrix can use fewer bits.

Again, suppose the counts are 32 bit numbers and are initialized to 0. An increment for each association observed may rarely use the upper bits unless the associations are heavily loaded. However, in the same way that associative matrices tend to be sparse (include many zero values), they also tend to be sparse in the bit-plane direction, tending toward lower values. Therefore, use of bit planes according to exemplary embodiments of the invention can reduce the amount of physical memory used to store the counts.

The data stored within a bit plane may be called a sub-segment. The sub-segment structure can include an array of a bit-masked lookup map and one or more data elements. Data elements can contain information if the corresponding association count contains a "1" for that plane. The actual representation of the data can only list data that contain non-zero values. The map can be stored in the $0^{th}$ location in the given plane and the next least significant bit of the map can correspond to the next data.

For large matrix structures, the number of segments can grow very large. The total memory requirements can be larger than the system's total memory. Therefore, structure may be used in conjunction with a virtual store caching system that can divide the large structures into many smaller blocks that can be loaded and purged from memory as desired.

Such a block-oriented design can use standard hierarchical persistence schemes, but very large scale associative memory applications generally are different than single matrix embedded systems. Whether for hardware or software processing, the problems of memory-intensive applications may be like those of data-intensive applications. The solutions of compression and partitioning can be used to store a massive number of such matrices, few of which need to be resident at any one time but which may need to be quickly fetched in whole or part to update them with new associations or read them to support a broad number of queries.

Exemplary embodiments of the invention need not actually start with a complete coincidence matrix and go through the steps of segmentation and bit-planing for example. Rather, incremental learning can be provided in which such representations are dynamically constructed and maintained. As new contexts are observed, new key-values are encoded and possibly translated, new segments might be created, and/or new bit planes might be formed.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of compressing an association matrix that contains a plurality of counts that indicate associations among a plurality of pairs of attributes, the method comprising:

generating a set of association matrix segments by dividing the association matrix into the set of association matrix segments, a respective one of which defines a subset of the association matrix that includes more than one of the plurality of pairs of attributes, the set of association matrix segments including a first portion of association matrix segments that have at least one count and a second portion of association matrix segments that have zero counts;

storing, in an associative memory, identifications of the first portion of association matrix segments so as to identify the association matrix segments that have at least one count; and storing, in the associative memory, the count of at least one of the first portion of association matrix segments that is associated with at least one of the stored identifications as at least one bit plane representation, the at least one bit plane representation identifying a value of the at least one associated count for a bit position of the count that corresponds to the associated bit plane.

2. The method according to claim 1 wherein storing the count of at least one of the first portion of association matrix segments that is associated with at least one of the stored identifications as at least one bit plane representation comprises:

splitting the at least one count that is associated with the at least one of the stored identifications into a plurality of bit planes;

identifying at least one of the bit planes that has non-zero bit plane data associated therewith;

generating a map that identifies a position of the non-zero bit plane data in the at least one bit plane that has non-zero bit plane data associated therewith;

generating at least one representation of the non-zero bit plane data that is associated with the at least one bit plane that was identified; and storing the map and the at least one representation of the non-zero bit plane data.

3. The method according to claim 1 wherein the following is performed between storing identifications and storing the count:

reorganizing the identifications of the first portion of association matrix segments into a continuous range; and wherein storing the count comprises storing the count of at least one of the first portion of association matrix segments that is associated with a respective segment of the continuous range as at least one bit plane representation, the at least one bit plane representation identifying a value of the at least one associated count for a bit position of the count that corresponds to the associated bit plane.

4. The method according to claim 3 wherein storing the count of at least one of the first portion of association matrix segments that is associated with a respective segment of the continuous range as at least one bit plane representation comprises:

splitting the count that is associated with the respective one of the continuous range into a plurality of bit planes;

identifying at least one of the bit planes that has non-zero bit plane data associated therewith;

generating a map that identifies a position of the non-zero bit plane data in the at least one bit plane that has non-zero bit plane data associated therewith;

generating at least one representation of the non-zero bit plane data that is associated with the at least one bit plane that was identified; and storing the map and the at least one representation of the non-zero bit plane data.

5. A The method according to claim 1 further comprising observing an association among observed attributes into the compressed association matrix, the observing comprising:

adding the association among the observed attributes to the at least bit plane presentation that corressponds to the observed attributes, if the observed attributes exist in the identification of segments of the association matrix that have at least one count that is associated therewith; and creating at least one bit plane representation for the observed attributes, if the observed attributes do not exist in the identification of segments of the association matrix that have at least one count that is associated therewith.

6. The method according to claim 1 further comprising imagining an association among selected attributes of the compressed association matrix, the imagining comprising:

obtaining the at least one bit plane representation that corresponds to the selected attributes in the compressed association matrix; and converting the at least one bit plane representation that was obtained to a count that identifies associations among the selected attributes.

7. A system comprising a memory that includes computer instructions that are configured to perform the method of claim 1.

8. A system comprising a memory that includes computer instructions that are configured to perform the method of claim 2.

9. A computer program product, the computer program product comprising a memory having computer-readable program code in the memory, the computer readable program code configured to perform the method of claim 1.

10. A computer program product, the computer program product comprising a memory having computer-readable program code embodied in the memory, the computer readable program code configured to perform the method of claim 2.

11. A computer program product, the computer program product comprising a memory having a data structure for a compressed association matrix including the identifications and the at least one bit plane representation of claim 1.

12. A computer program product, the computer program product comprising a memory having a data structure for a compressed association matrix including the identifications and the at least one bit plane representation of claim 2.

* * * * *